Feb. 16, 1937. W. B. PAYNE 2,071,139
PRINTING APPARATUS
Filed Jan. 25, 1934 11 Sheets-Sheet 1
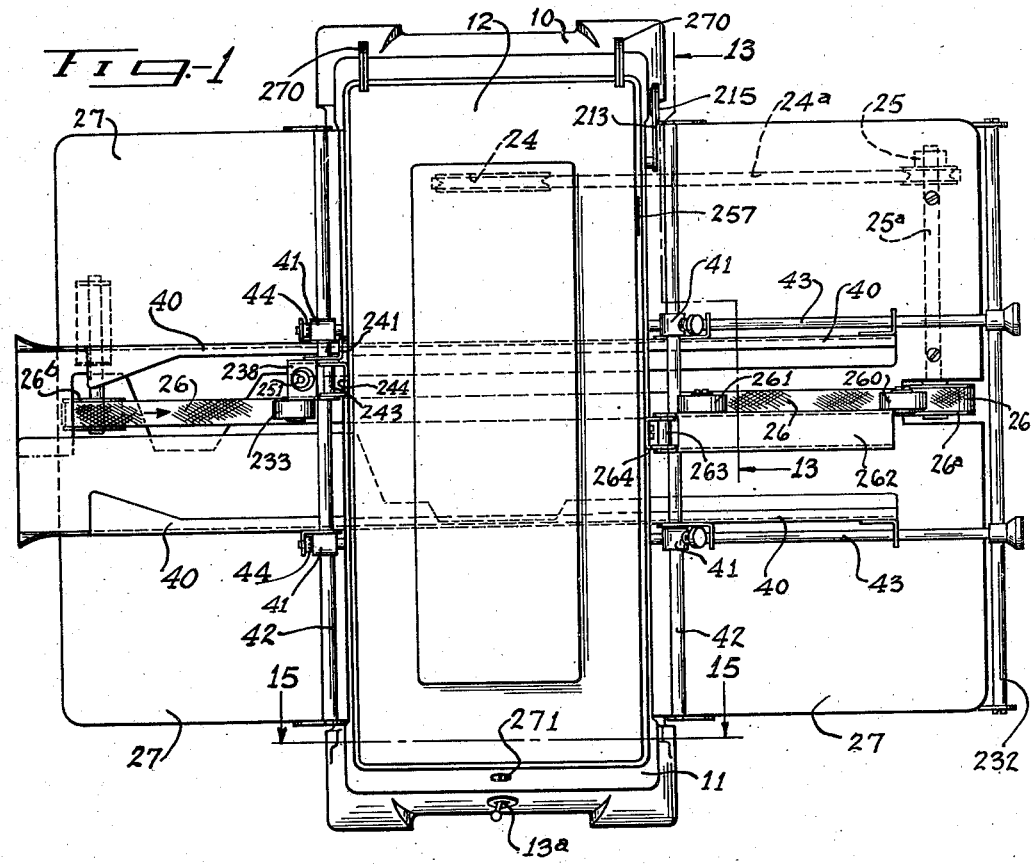
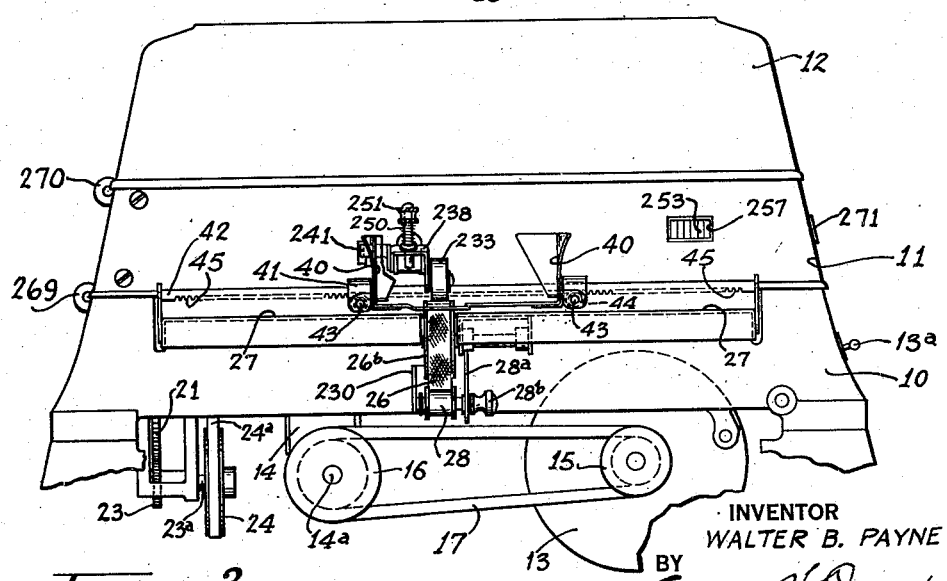
INVENTOR
WALTER B. PAYNE
BY
Edward H Crumpston
ATTORNEY Feb. 16, 1937.　　　　W. B. PAYNE　　　　2,071,139
PRINTING APPARATUS
Filed Jan. 25, 1934　　　11 Sheets-Sheet 2
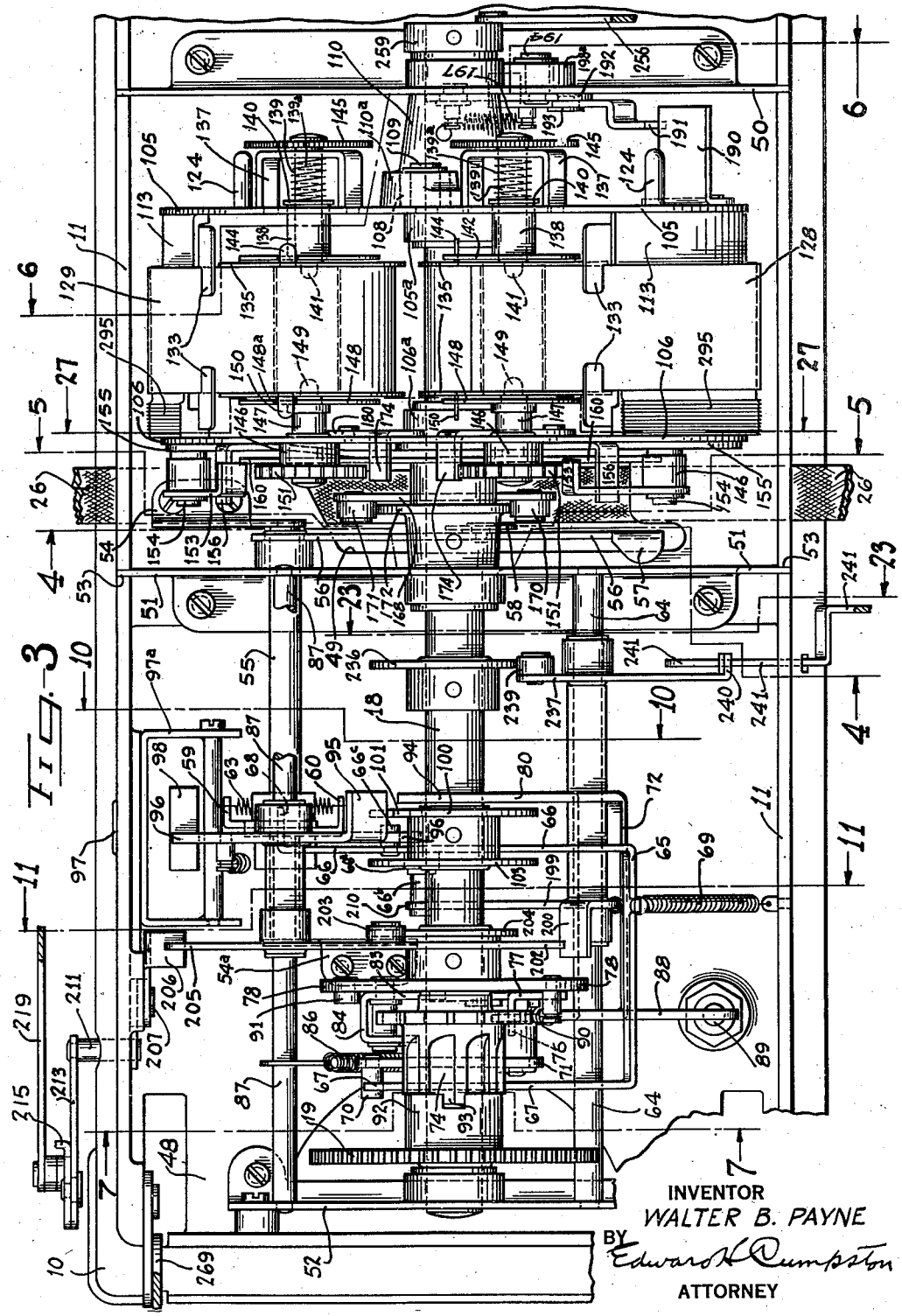
INVENTOR
WALTER B. PAYNE
BY
Edward H. Cumpston
ATTORNEY

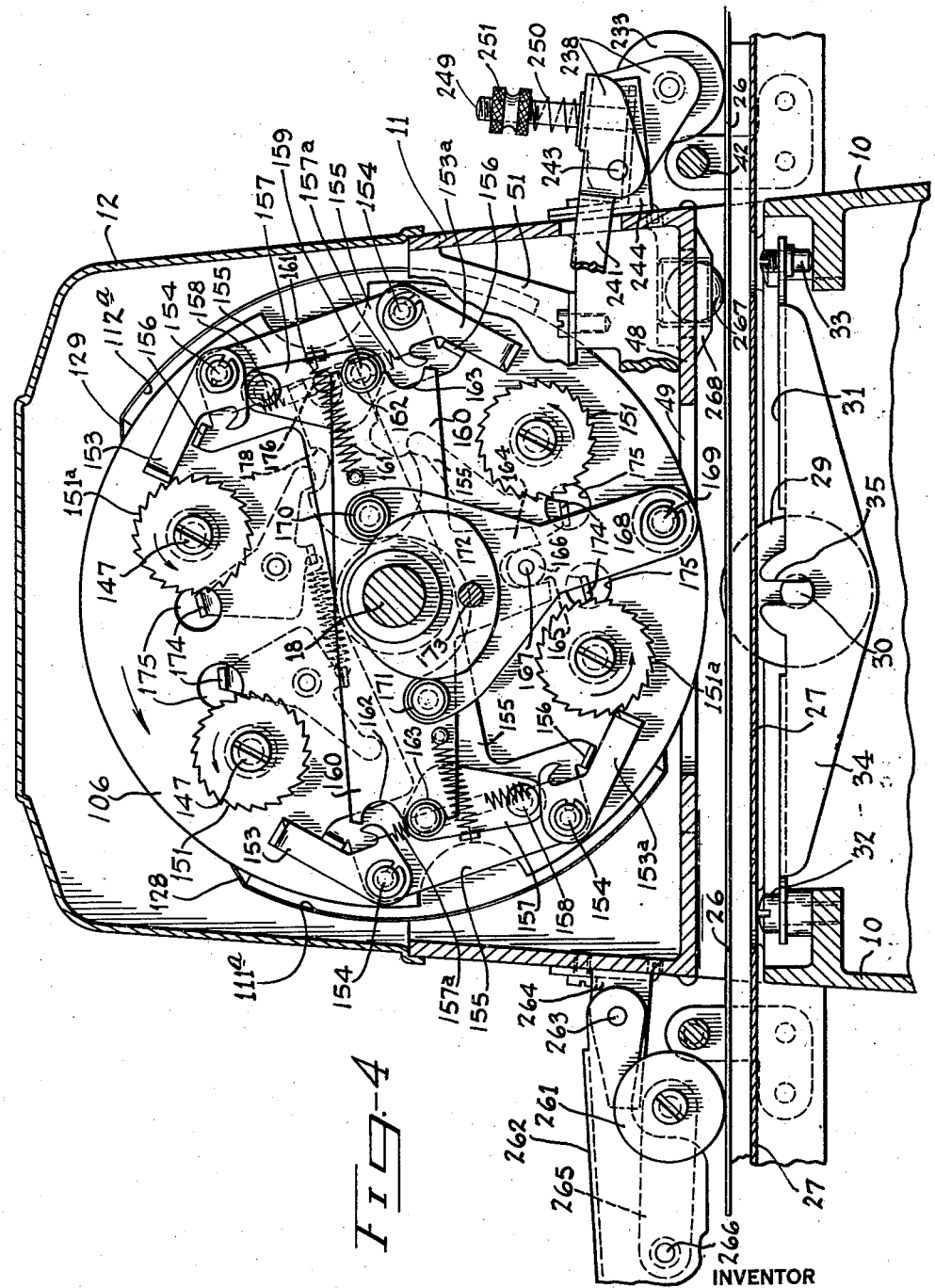

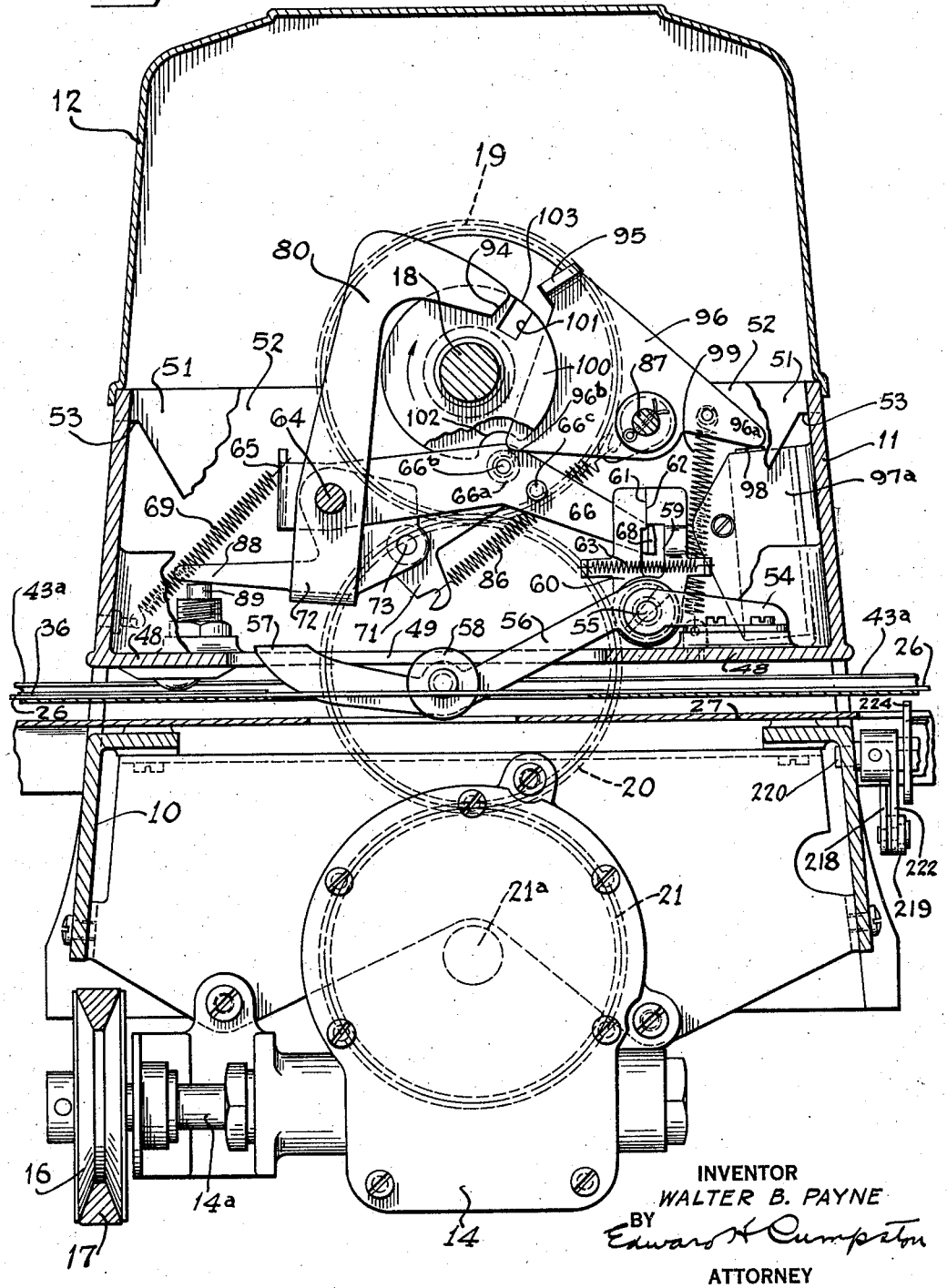

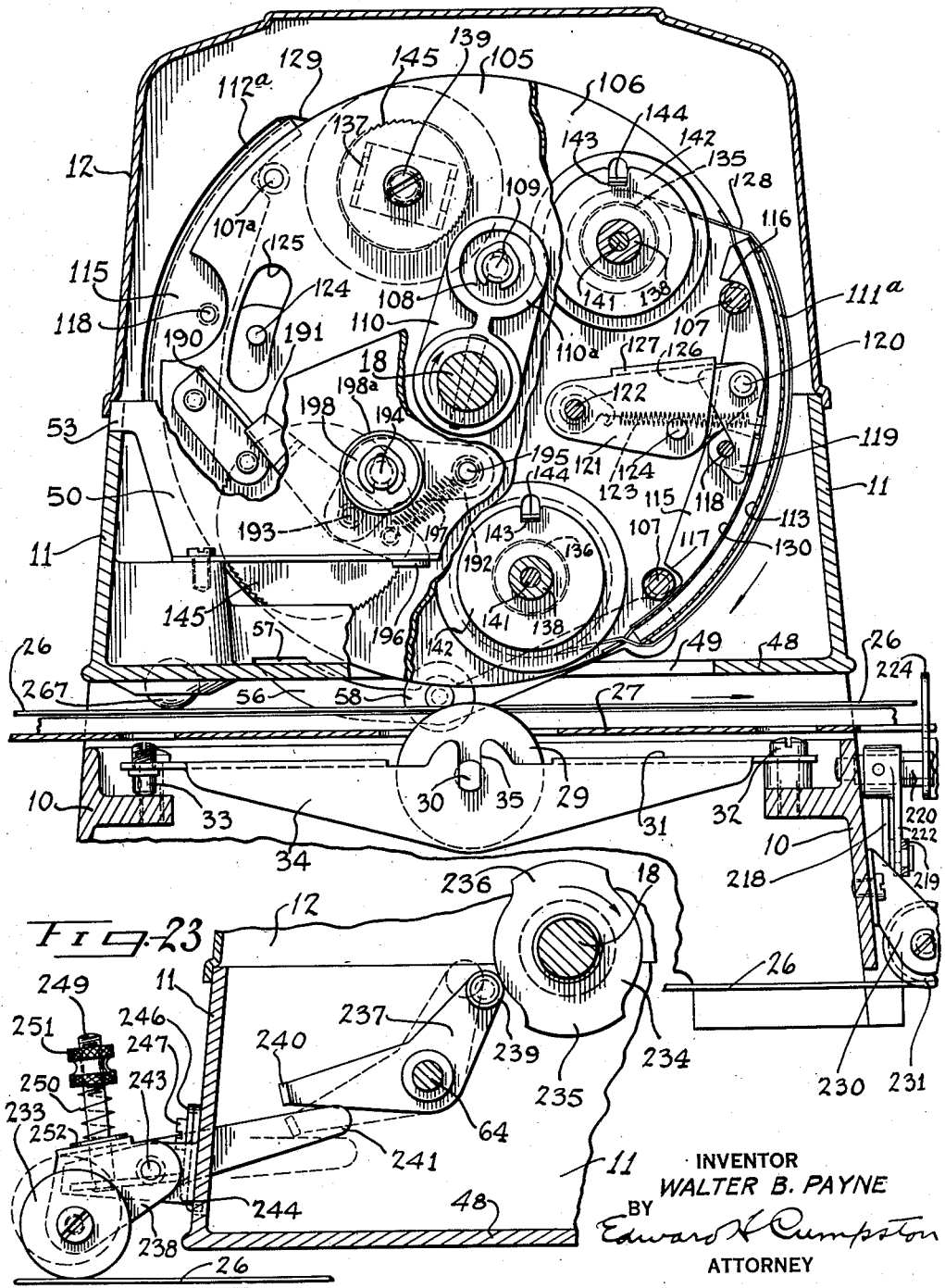

INVENTOR
WALTER B. PAYNE
BY Edward H. Cumpston
ATTORNEY

Feb. 16, 1937.                W. B. PAYNE                2,071,139
                            PRINTING APPARATUS
                       Filed Jan. 25, 1934.    11 Sheets-Sheet 7
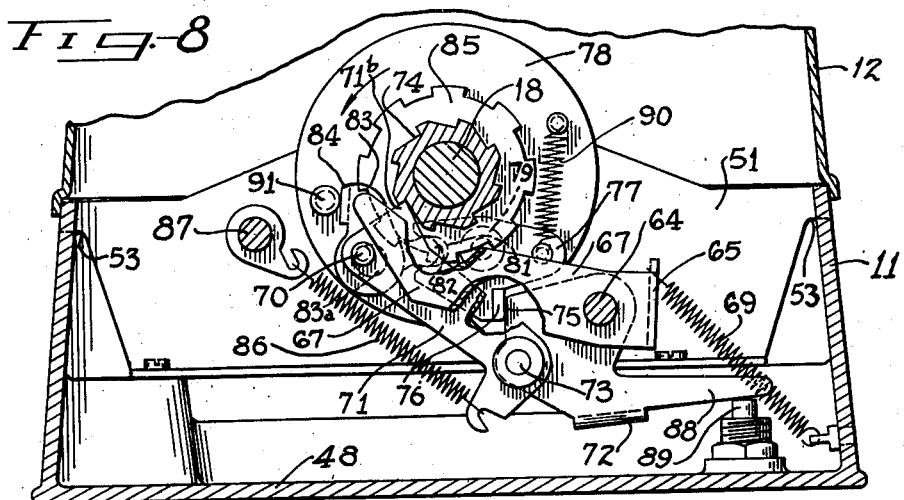
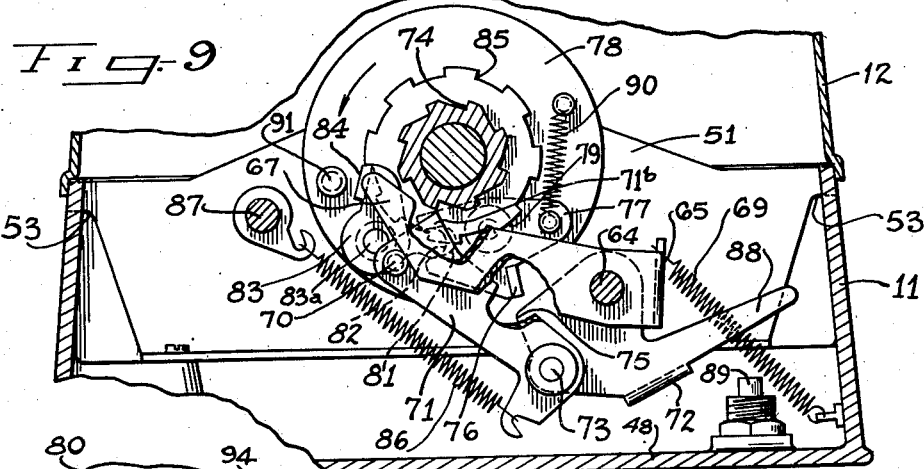
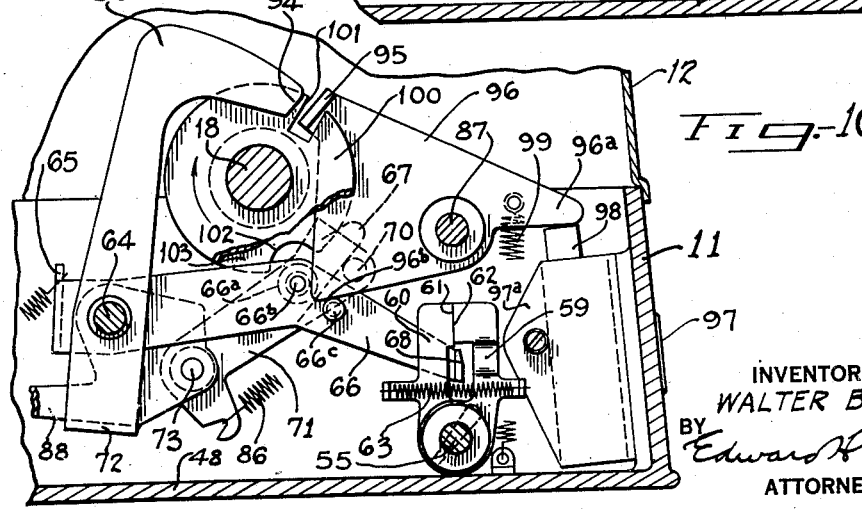
INVENTOR
WALTER B. PAYNE
BY Edward H. Cumpston
ATTORNEY Feb. 16, 1937. W. B. PAYNE 2,071,139
PRINTING APPARATUS
Filed Jan. 25, 1934 11 Sheets-Sheet 8
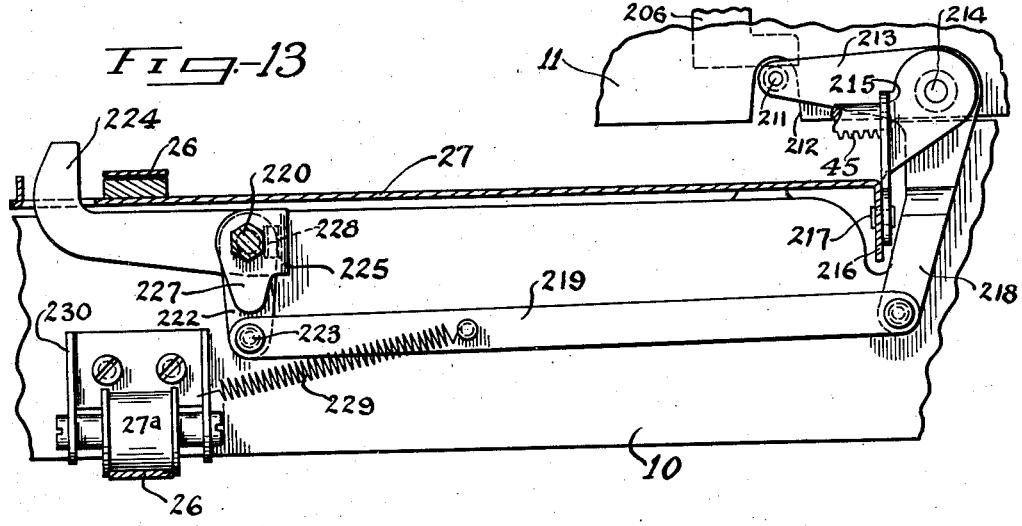
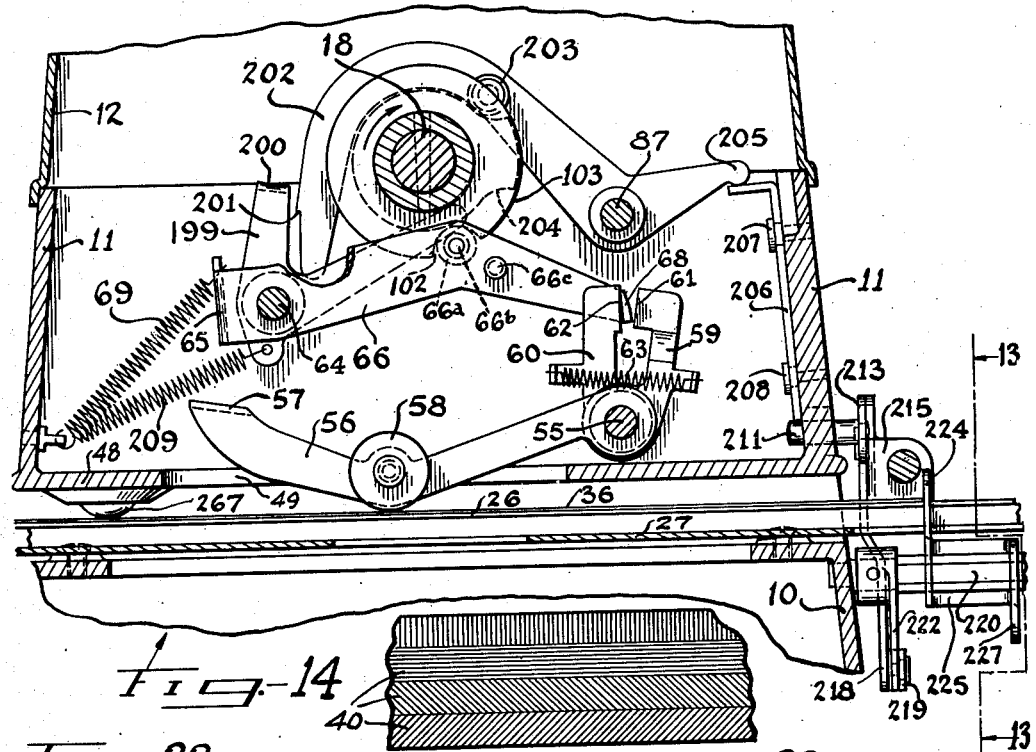
INVENTOR
WALTER B. PAYNE
BY
Edward H. Cumpston
ATTORNEY

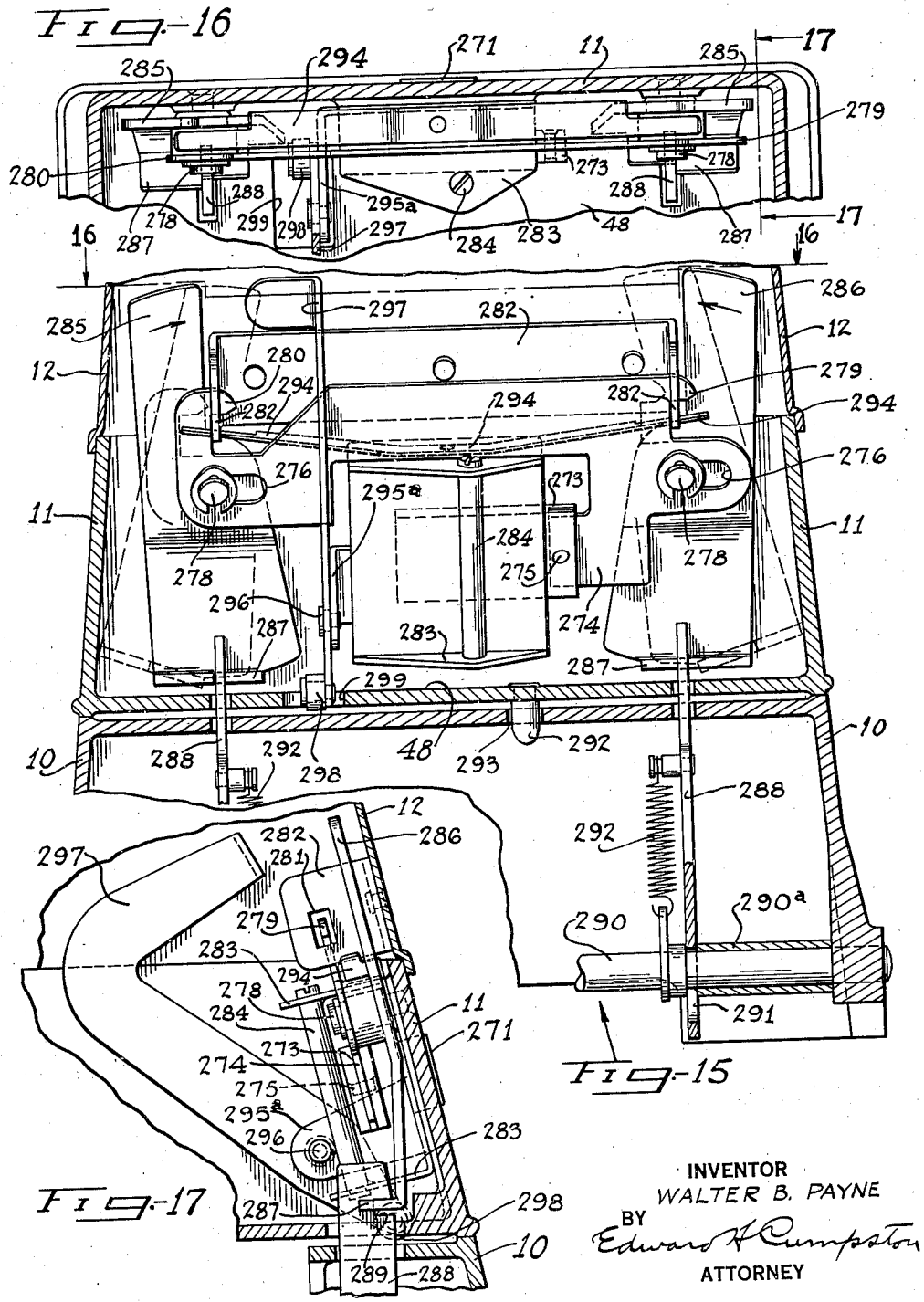

Feb. 16, 1937.  W. B. PAYNE  2,071,139
PRINTING APPARATUS
Filed Jan. 25, 1934     11 Sheets-Sheet 10

INVENTOR
WALTER B. PAYNE
BY
Edward H. Cumpston
ATTORNEY

Feb. 16, 1937.    W. B. PAYNE    2,071,139
PRINTING APPARATUS
Filed Jan. 25, 1934    11 Sheets-Sheet 11
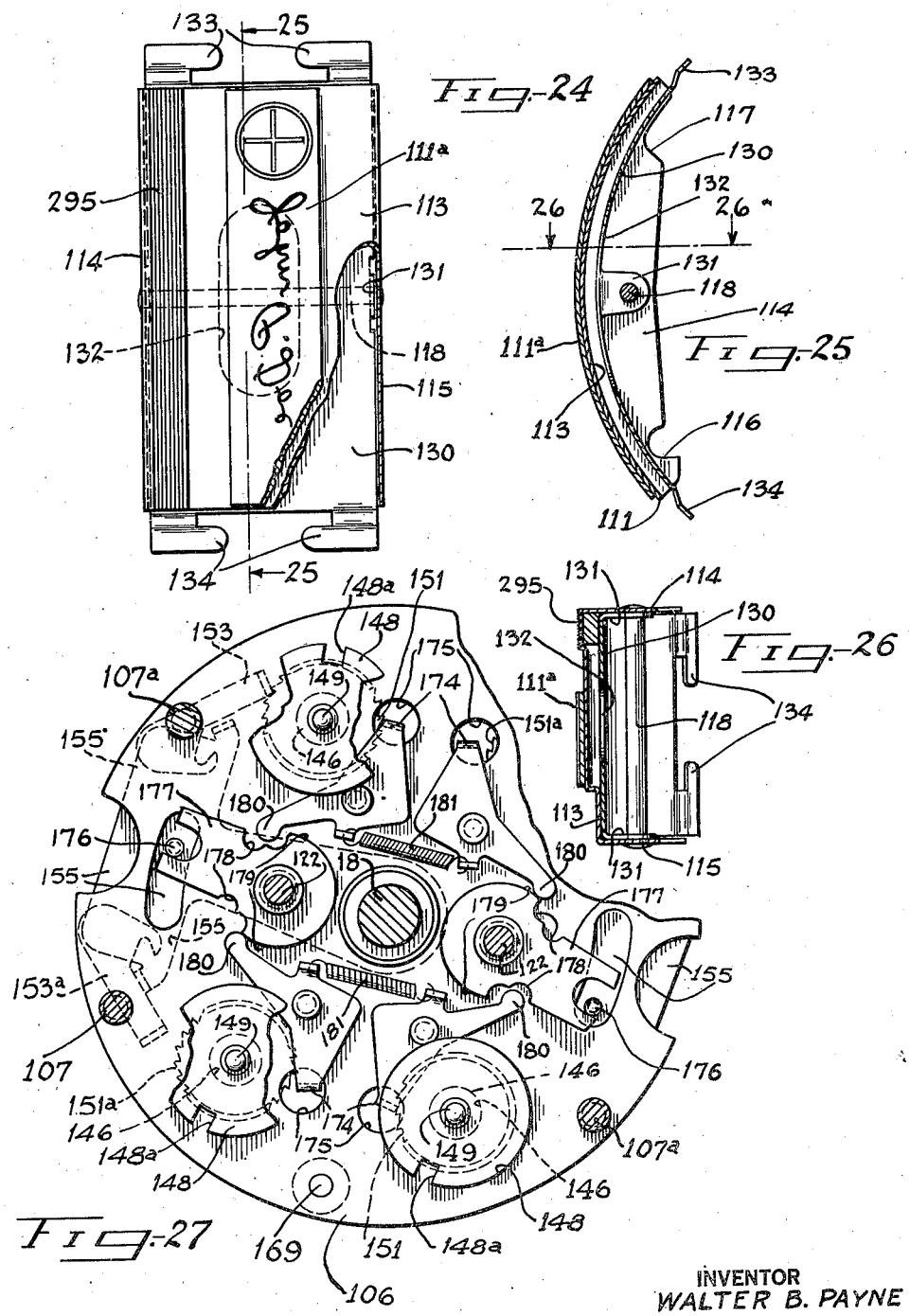
INVENTOR
WALTER B. PAYNE
BY
Edward H Cumpston
ATTORNEY Patented Feb. 16, 1937

2,071,139

UNITED STATES PATENT OFFICE 2,071,139

PRINTING APPARATUS

Walter B. Payne, Rochester, N. Y., assignor to The Todd Company, Inc., Rochester, N. Y., a corporation of New York Application January 25, 1934, Serial No. 708,279

41 Claims. (Cl. 101—235)

The present invention relates to means for printing value representing instruments such, for example, as negotiable paper. An object of the invention is to provide improved means for making or signing checks, drafts, certificates, and other value representing instruments, including devices for printing thereon or applying thereto as a part of the act of making or signing the same, one or more predetermined symbols, in different colors, and of such a character as to be readily recognizable but far more difficult to reproduce than the usual hand signature of the maker's name, and which will tend to discourage and prevent forgery on the part of dishonest persons. Such a symbol may be a representation of some object associated with the maker of the instrument, or some relatively complicated design, the purpose being to employ one or more symbols or designs of such character as to be readily recognized upon casual inspection, but at the same time difficult to reproduce and forge. Such symbols are used in association with a printed facsimile of the hand written signature of the maker of the instrument, as more particularly described hereafter.

A further object of the invention is to provide an improved method of making or signing instruments of the above character comprising printing thereon one or more symbols of the character described, in different tints or colors and in relatively intricate and finely marked details as an obstacle to reproduction, and by the use of means which permits of the rapid signing of such instruments with a minimum expenditure of time and effort.

A further object of the invention is to provide an improved method of signing the instruments, comprising printing different parts of the complete signature in different tints or colors, and also printing a protective ground portion for the same in one or more colors, for safeguarding the signature against photographic or other methods of reproduction. This may be accomplished by printing on the instrument, a facsimile of the name signature of the maker in one color, in association with an intricate design of a different color, and printing a protective ground portion for said name and design portions in still a different color, or by printing portions of each or one or more of the different distinctive parts of the complete signature in different tints or colors.

A further object of the invention is the provision of means whereby instruments of the character described may be signed or rendered negotiable in an exceedingly secure and at the same time rapid and convenient manner as particularly desirable for banks, railroads, manufacturers, and other concerns having a relatively large number of payroll or other checks to be signed, an operation which, under the methods heretofore in use, has proven laborious and time consuming, particularly for executive personnel whose time could be more profitably devoted to other work.

A still further object of the invention is to provide improved means for printing bank checks, drafts, certificates and like instruments having a form of signature which may be readily recognized and identified on casual inspection and which is at the same time far more secure against the reproduction and forgery of the signature than when merely bearing the hand signature of the maker. Such instruments may be further improved in appearance over the hand signed variety by the selection of artistic and ornamental symbols of one or more colors to replace or supplement a hand-written signature by the maker.

A further object of the invention is to provide an improved printing apparatus for successively applying different characters or symbols upon substantially the same portion of a sheet, or in superimposed relation on the sheet.

A further object of the invention is to provide improved printing mechanism, and operating means therefor, in which the latter is conditioned for operation by the positioning of the individual sheets to be printed within the machine.

A further object of the invention is the provision of sheet feeding mechanism, and a stop mechanism associated therewith and rendered effective for automatic operation by mechanism controlled by the positioning of the sheets within the machine.

A further object of the invention is to provide combined sheet printing, feeding, operating, and stop mechanisms, in which the operating mechanism is normally idle and is automatically coupled with power means for driving the same, upon release of certain parts, actuated by movement of the sheets to a predetermined position within the machine, following which the sheet printing and stop mechanisms are operated automatically to print the sheets and to control the movements thereof.

A further object of the invention is to provide an improved rotary printing unit, together with automatic mechanisms for driving and interrupting operation of the same, and also means for yieldingly resisting rebound movements of the unit when discontinuing the driving operations.

A further object of the invention is to provide an improved printing apparatus for applying selected characters, symbols, or indicia upon sheets, in different colors.

A further object of the invention is to provide improved printing mechanism for successively effecting different printing operations, each on substantially the same portion of a check, or other negotiable instrument, whereby to superimpose on said portion representations of different distinctive parts of the maker's signature in the same or different colors to render the signature extremely difficult to forge or reproduce.

A further object of the invention is the provision of improved printing apparatus, including feeding mechanism for the sheets to be printed, automatic means for arresting movement of the sheets, and a printing device operating to reverse the movement of the sheets and adapted to print thereon during the reverse movements and subsequently releasing the sheets for continued movement by the feeding mechanism.

A further object of the invention is to provide an improved power driven clutch mechanism for operating the printing apparatus.

A further object of the invention is the provision of an improved rotary printing unit having one or more printing plates thereon provided with inking ribbon means and automatic feed means for the same, together with automatic means for reversing the feed means to effect reversal of the ribbon means during operation of the unit.

A further object of the invention is to provide an improved printing plate for applying various characters, indicia, or designs to the sheets to be printed, together with means for engaging and moving the sheets during the printing operations.

A further object of the invention is to provide one or more detachable printing plates on a rotary unit, in combination with a multicolored ribbon or ribbons for cooperation with platen means whereby to reproduce the type or various characters on the plates in one or more colors on the sheets to be printed.

A further object of the invention is to provide two or more improved printing plates having thereon different parts of selected characters or designs affording a complete signature for application to a check or other negotiable instrument, together with means for operating the plates to successively apply the different parts of the signature to the check.

A further object of the invention is to provide improved lock controlled means for preventing unauthorized operation of the printing apparatus and also lock controlled means for protecting and preventing access to the type holding parts.

A further object of the invention is to provide on the base of the machine, a casing for enclosing the printing apparatus and other parts, together with means for effecting relative movement between the base and casing and means for latching or locking the casing upon the base.

To these and other ends the invention resides in certain improvements and combinations of parts, all as will be hereinafter more fully described, the novel features being pointed out in the claims at the end of the specification.

In the drawings:

Fig. 1 is a plan view of a machine embodying the invention;

Fig. 2 is a side elevation of the same;

Fig. 3 is a fragmentary plan view with the cover of the machine removed;

Fig. 4 is a transverse section on line 4—4 of Fig. 3;

Fig. 5 is a transverse sectional elevation substantially on line 5—5 of Fig. 3, showing a portion of the clutch trip mechanism;

Fig. 6 is a fragmentary transverse sectional elevation substantially on line 6—6 of Fig. 3, showing the rotary printing device and other parts;

Fig. 8 is a view similar to Fig. 7 showing the clutch release means in engagement with the clutch driving member by which the release means is operated;

Fig. 9 is a view similar to Fig. 7 showing the driving and driven parts of the clutch in operative relation;

Fig. 10 is a fragmentary sectional elevation on line 10—10 of Fig. 3, showing certain of the clutch control parts locked to prevent operation of the machine;

Fig. 13 is a fragmentary longitudinal section taken on line 13—13 of Figs. 1 and 14, showing the sheet stop mechanism in position to arrest movement of the sheets;

Fig. 14 is a fragmentary transverse sectional elevation showing the sheet stop mechanism at operating position and the controlling parts therefor as they appear when tripped by the sheet upon advancement of the latter into engagement with the stop;

Fig. 15 is a transverse sectional elevation taken on the line 15—15 of Fig. 1, showing the locking mechanism for the casing cover and the latching and separating mechanisms between the base and the casing;

Fig. 16 is a sectional plan taken on line 16—16 of Fig. 15;

Fig. 17 is a fragmentary sectional elevation on line 17—17 of Fig. 16 showing the locking, latching and separating mechanisms shown in Fig. 15;

Fig. 18 is a side elevation of the machine showing the cover swung to open position and the casing moved to an inclined position relative to the base;

Fig. 19 is a view showing a part of the check, having printed thereon a portion of the maker's signature;

Figure 7:
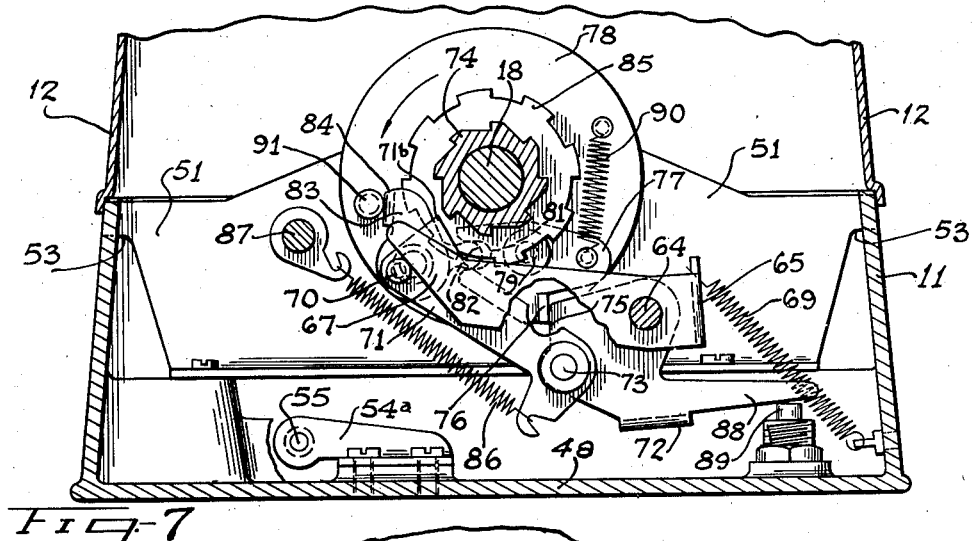
Fig. 7 is a fragmentary sectional elevation taken on line 7—7 of Fig. 3, showing the clutch and associated parts at normal inoperative position.

Fig. 20 also shows a part of the check, to which has been applied the written portion of the signature in conjunction with an identifying sign or symbol;

Fig. 21 is a view showing a check having the complete signature applied thereto;

Fig. 22 is a modification, showing a part of a check on which the background for the signature is shown applied in a variety of colors;

Fig. 22a is a view showing a section of a multicolored ribbon for use in printing the checks;

Fig. 23 is a fragmentary transverse sectional elevation showing a pressure roll for holding the sheets in position upon the feed belt and also showing a portion of the operating means for releasing the roll;

Fig. 24 is a plan view of one of the printing plates and a holder therefor;

Fig. 25 is a longitudinal section taken on line 25—25 of Fig. 24;

Fig. 26 is a transverse section on line 26—26 of Fig. 25, and

Fig. 27 is a transverse sectional elevation taken substantially on line 27—27 of Fig. 3, showing various ribbon control parts on one of the side plates of the rotary printing unit.

The same reference numerals throughout the several views indicate the same parts.

The method

The method of signing checks, drafts, and similar instruments by hand, as heretofore generally employed, has had the disadvantage that a hand signature is a comparatively simple marking, which also varies considerably from time to time, so that forgers have found it comparatively easy to reproduce signatures with sufficient accuracy to make it difficult, if not impossible, for the bank teller to detect such forgeries. Another serious disadvantage of this method of making or signing instruments has been the amount of time and labor required, particularly where checks are issued in any considerable quantity and, in such cases, this time and labor is often required of executive personnel whose time could be more usefully devoted to work of a less manual and more executive and important character. Attempts have been made to substitute for such hand signature method, the printing of signature facsimiles, but this method has not been generally favored because of the supposed ease with which fraudulent reproduction of such printed signatures might be accomplished.

It has also been proposed to incorporate during the printing of the blank check or other instrument, identifying markings, such as a symbol, portrait, facsimile, signature, or other mark associated with the person by whom the instrument is required to be signed in order to complete or validate it, but such markings have only been applied in the previous printing of the blank check and as a part thereof, and not in any case as a part of the act of validating or signing the check or in association with the signature portion. In other words, such markings have merely accompanied the blank check as an unsigned stock form, and have not in any way protected the signature or validating portion against forgery by anyone into whose hands a blank check may have fallen. One of the defects of such an expedient is that while it may increase the difficulty of reproducing the blank check, it does not in any way increase the difficulty of forging the signature of the maker on the instrument. All that is required in such a case is to obtain a sample of the blank check or other instrument which can then be completed by a forged signature in the usual way. In fact, the initial application to the instrument of symbols of this character and particularly a facsimile of the maker's signature, tends to make it easier for an unscrupulous person to successfully forge the maker's signature thus placed before him on the check, and to present the check with a semblance of authority arising from its possession, and of course, the use of secret identifying markings which require special examination or microscopic scrutiny of the instrument are of little use for the obvious reason that the busy bank teller, for example, has no time or opportunity for such critical examination.

The present invention, on the other hand, overcomes these defects and provides a far more secure as well as a far more rapid and less laborious method of making or signing such instruments, as well as a form of instrument itself, the signature of which is effectively guarded against forgery, and the validity of which may be safely assumed.

The method of the present invention comprises the impression upon the check or other instrument of some predetermined symbol of a superficially recognizable identifying character, but preferably including finely marked details to render it more or less complicated in nature, and thus more difficult to reproduce than the signature of the name of the maker of the instrument. Such a symbol is impressed upon the instrument as a part of the act of making or signing the same, in association with a printed, uniform or standard facsimile of the hand signature of the name of the maker, thus providing a duplex, protected form of printed signature of uniform character, easy to identify, but practically impossible to reproduce or forge.

To further protect the duplex form of signature against forging, or unauthorized reproduction, the distinctive parts thereof, such, for example, as the facsimile of the name signature, the complicated design or symbol associated therewith, and, if preferred, a protective ground portion for said parts, are printed in different tints or colors, or, if preferred, different portions of one or more of said parts, including the protective ground portion, may be printed in different or contrasting colors, whereby to safeguard the signature against reproduction by photographic or other methods. By printing the different parts of the signature on the check, or similar instrument, in different colors it will be extremely difficult to obtain a satisfactory reproduction of the signature by the photographic method, since it is well known that certain colors cannot be successfully or satisfactorily reproduced by this method.

In Figs. 19 and 20 of the drawings there is shown a portion of a bank check at 36, the portion shown in Fig. 19 having thereon a protective ground 37 for the signature, while the portion shown in Fig. 20 has applied thereto one form of duplex signature, comprising a representation 38 of a conventional design or symbol of the above described character and a representation at 39 of the hand signature of the maker or facsimile thereof, it being understood that the portions 37, 38, and 39 of the signature, or parts thereof will be printed in different tints, colors, or contrasting shades.

In Fig. 21 a representation of the complete signature is shown applied to the blank space usually provided for the hand signature of the maker. The symbol or conventional design 38 is employed to supplement the hand signature and the protective ground portion is composed of a multiplicity of fine elements or lines to indicate any attempted erasure and to make it more difficult to reproduce the signature.

It is apparent that such a symbol or design may be immediately or superficially recognized or identified, without an intensive examination, as the predetermined indication that the instrument has been authorized by one by whom it purports to have been issued. It is of a relatively complicated character composed of finely marked details in different colors, which could not be reproduced without resort to some systematic and expensive process of reproduction. As compared with the mere copying or forging of a hand signature, such reproduction of the design interposes a far greater obstacle to fraudulent making of the instrument. An agreement may be reached, for example, with the bank upon which checks are to be drawn that such design, protective ground, and hand written signature shall be required together to constitute signature or authorization by the maker of the check and the bank officials may then honor checks so signed with a high degree of assurance that such checks are valid.

Fig. 22 shows a portion of a check 36a having thereon at 37a a conventional representation of a multicolored protective ground portion for the duplex signature, the different colors being applied in any suitable manner as, for example, by the use of a multicolored ribbon, such as that shown diagrammatically in Fig. 22a. In this modification the conventional form of design or symbol is indicated at 38a, while a representation of the maker's signature is shown at 39a.

The advantage in providing a multicolored protective ground portion for the duplicate form of signature is to render reproduction of the signature more difficult. By printing the multiplicity of fine elements or lines of the protective ground in a number of different colors, as indicated in Fig. 22, any attempt at reproduction of the duplicate portion of the signature must necessarily include a successful reproduction of the protective ground portion, if the signature as a whole is to be reproduced with such accurateness or clearness as not to create suspicion on the part of those familiar with the authorized signature of the maker of the check.

It will be noted that the symbolic signature, such, for example, as the design 38 shown with the facsimile signature 39 and preferably with the protective ground 37, are reserved for application to the otherwise completed check, so that such application constitutes the final act of signing or validating the check. In other words, the printing operations are segregated by first printing the check with the routine indicia, such as the name and location of the maker of the check, the name of the bank on which it is drawn, and the designations of the blanks to be filled in with the data of the respective checks. This constitutes the familiar blank check which is kept in stock until desired for use, at which time the name of the payee, amount, and date are filled in. The check is then signed or validated by printing thereon the predetermined duplex signature of the maker comprising the facsimile name signature associated with the protective symbolical signature referred to above, and also the protective ground, if preferred. By this method the blank checks contain no part of the validating signature until in the final act of rendering the check negotiable. Thus no part of the signature is applied until the maker is ready to issue the check and then the application of the duplex signature as described interposes an effective bar to any forgery or other unauthorized manipulation as to the signature portion of the check.

While signatures of the above described character may be applied to the instrument by embossing, or in various other ways, it is preferred to print the same thereon by some means of a nature adapted for effecting the desired precision of detail. It has been found that this may be accomplished with particular success by methods analogous to lithography because of the fineness of execution afforded by such methods.

The present method has been practiced with success in a commercial way by the use of printing plates, for example, of the type shown and described herein. Apparatus for effectively carrying out the method may thus be provided in relatively small and convenient size. It may be kept under lock and key, and may itself embody a locking means so that it cannot be operated except at the proper time and in the proper way by authorized persons. At the same time, checks or other instruments otherwise more or less completed as to the routine indicia may be rapidly printed with a signature such as described, by some authorized employee, thus releasing executive officials from the tedious manual labor of signing the instruments by hand. The importance of such economy of time and effort is readily apparent, as for example, in connection with the frequent periodic issue of a large number of payroll checks, as practiced by many business concerns.

With the present method, a would be forger is first confronted with the problem of obtaining previously issued checks to serve as models for duplication, and is then put to the very considerable difficulty and expense of an attempt at reproduction of the signature, including the different colors thereof and of applying the same to means for affecting an impression upon the check, in the course of which labor, moreover, he is quite likely to afford opportunity for detection of his fraudulent activities. The difficulty and obstruction thus interposed in the way of the would be forger is of such a character as to practically eliminate the danger of forgery.

The present method further increases the degree of protection as compared with handwritten signature in that it provides for entire uniformity at all times in the signature, or in other words, for a standard facsimile, as opposed to the variation in handwriting from day to day which is a common experience, and the present method furthermore affords an opportunity to introduce into the signature an artistic and ornamental quality which enhances the appearance of the entire instrument.

Apparatus

The present construction embodies generally, apparatus for applying characters to sheets, such for example, as checks and other negotiable paper. In the preferred embodiment of the invention the characters are applied by printing them upon the sheet preferably by automatically operated mechanisms comprising generally a rotary printing device, a constantly operating motor, and driving means interposed between the motor and the printing device. The driving means includes clutch mechanism controlled by the positioning of the sheets to be printed within the machine, which are advanced by suitable feeding means to the printing device, the latter making a predetermined number of revolutions for each sheet printed, preferably one, and the clutch being automatically connected when the individual sheets are moved to a predetermined position and automatically disconnected when the printing operations are completed.

The character holding device or printing unit is rotated in a direction opposite to that in which the sheet is advanced by the feeding means and carries a plurality of printing or character holding elements, which engage and operate upon the sheet during each revolution of the unit. The character holding elements may or may not be made to operate upon the same portion of the sheet, but where it is desired to superimpose one design or set of characters upon another, this can be readily done with the present device.

In the operations of superimposing one set of characters or one design upon another, the printing or rotating character holding elements will successively engage substantially the same portion of the sheet, preferably during each revolution of the unit. In such an operation, the feed belt will move the sheet in one direction, between the platen and the unit and into engagement with suitable automatic stop means. One of the printing elements will then reverse the movement of the sheet and at the same time print thereon. This element will then release the sheet for return to the stop means by the feed belt. At this time the next succeeding printing element will engage and reverse the movement of the sheet and will then print substantially on that portion upon which the characters were applied by the first mentioned printing element, following which the sheet will again be released and continued through the machine by the feed belt, the stop means by this time having been returned to normal non-obstructing position by means provided for actuating the same.

In the present construction the rotary unit is provided with separate detachable printing plates for printing upon a check or other negotiable paper, one of the plates being designed to print a duplex form of validating signature by printing on the check a facsimile of the name signature of the maker and printing in association with said name signature a predetermined symbolic signature, formed by a representation or design of an intricate character difficult to reproduce or forge, whereby to safeguard the name signature. The other plate is designed to print a protective ground portion for said duplex signature, constituting in effect a background for the signature.

The printing plates are each provided with an inking ribbon, the ribbons preferably being of different colors, and, if desired, one or each of the ribbons may be of the multi-colored type, whereby any attempt to fraudulently reproduce the signature by obtaining a photographic copy of the same is made extremely difficult or practically impossible of accomplishment.

The rotary printing unit is provided with automatic ribbon feeding and reversing means whereby the ribbons are moved step by step over the printing plates during operation of the machine.

The driving mechanism for the printing unit is protected against operation by unauthorized persons, by means of a lock concealed within the mechanism casing, the key to which is entrusted to the operator of the machine, who may or may not be allowed to have access to the casing enclosing the printing unit, whereby to prevent removal of the printing plates by unauthorized persons, for the purpose of duplicating the same.

However, a second and independent lock is provided for the cover and casing, the key for which may be placed in the hands of one having custody of the machine, who can be held responsible for the printing plates and other parts enclosed within the casing.

To condition the machine for operation, it is only necessary to release the bolt of the lock for controlling the operating parts, at which time the switch may be operated to start the motor. The sheets may then be inserted within the guides and will be advanced by the feeding means and operated upon by the printing unit, after which they will be discharged from the machine by the feeding means, preferably into a suitable receptacle provided for the purpose.

The present construction comprises a base 10 having a casing 11 thereon provided with a hinged cover 12. Mounted on the base is an electric motor 13 for driving certain parts of the operating mechanism, including a worm shaft 14a extending within the worm housing 14, the worm shaft having a pulley 16 driven by the motor pulley 15 through the medium of a belt 17 shown in Fig. 2. A switch 13a is provided for controlling the motor circuit.

The main or clutch driving shaft 18 is provided with a gear 19 meshing with an intermediate gear 20 driven by a gear 21 on a shaft 21a extending from the wall of the housing 14, the shaft 21a being driven by a worm gear within the housing, which is driven by a worm on the shaft 14a, Figs. 2 and 5. The gear 21 serves to drive a pinion 23 on the shaft 23a which carries a pulley 24 for driving the belt 24a. The belt 24a engages a pulley 25 on a shaft 25a having a second pulley 26a thereon for driving the sheet feeding belt 26, extending over a pulley 26b, Fig. 1.

The pulley 25, shaft 25a, and pulleys 26a and 26b are suitably connected with and supported by a shelf 27 extending beneath the casing 11 on opposite sides thereof through an opening in the base or frame 10, Figs. 1 and 2. The lower flight of the belt extends beneath the base 10 and is guided by a pair of rollers suitably supported by the frame, one of which is shown at 27a, Fig. 13. A tension roller 28 engages the belt beneath the shelf, the shaft of the roller being adjustable vertically upon a support 28a depending from the shelf and held in adjusted position by tightening a nut 28b on the roller shaft.

The platen roller 29, which may be formed of any suitable material, is carried by a stud 30 on a supporting member 31 secured to the base 10 by means of a screw 32 and an adjustable stud 33, Figs. 4 and 6. The platen supporting member 31 includes oppositely disposed side portions 34 having slots 35 therein which receive the flattened ends of the stud 30 whereby the latter is prevented from rotating.

The sheet or check to be operated upon by the machine is shown at 36 and has applied thereto the protective ground 37, the validating design or symbol 38 and the facsimile of the maker's signature 39, as shown in Fig. 21. In Fig. 22 there is disclosed a modification, showing a portion of a check 36a, on which is printed a multi-colored ground 37a which carries a design or symbol 38a and a facsimile of the maker's signature as shown at 39a, the ground being printed in a variety of colors, as indicated conventionally by the various angularly disposed lines shown in Fig. 22, on which the design and name signature are superimposed in different colors.

The means for guiding the sheets through the machine comprises a pair of spaced guide members 40 overlying the shelf 27 and supported for adjustment each independently of the other by bearings 41 slidable on the oppositely disposed members 42, Figs. 1 and 2. Adjustment of the guides is effected by turning the rods 43 which carry pinions 44 meshing with teeth 45 formed on the members 42, the rods extending through and being supported within the bearings. The guides 40 may be readily adjusted to accommodate sheets of different widths and to vary the position of the sheets relative to the belt 26 and to the printing line as well, the sheets being inserted between the ends of the guides at the left side of the machine as viewed in Fig. 1.

The casing 11 is provided with a bottom wall 48 having an opening 49 therein, the side walls of the casing being connected by transverse plate members 50 and 51 and an additional upstanding plate member 52 being provided adjacent one end of the casing, said plate members having suitable bearings in which the shaft 18 is mounted for rotation. The ends of the plates 50 and 51 are provided with reduced portions 53 which are fixed within slots formed in the upper edges of the side walls of the casing as shown in Figs. 5 to 9 inclusive.

Secured on the bottom wall of the casing are brackets 54 and 54a in which the opposite ends of a rod 55 are journaled, the rod having secured thereon an arm 56 having an offset portion 57 at its free end which normally rests on the bottom wall of the casing as shown in Fig. 5. The arm is provided intermediate its ends with a roller 58. When the check or sheet to be printed is being advanced through the machine by the belt 26 it will pass under the roller at which time it will lift the arm 56 to the position shown in Fig. 14. This movement of the arm serves to rock the shaft 55 on which is fixed a finger 59 located opposite a second finger 60 which is pivoted loosely on the shaft. The fingers 59 and 60 are provided respectively, with offset portions 61 and 62 which are normally held in contact one with another by a spring 63 extending between the fingers as shown in Fig. 5.

A rod 64 has its opposite ends supported by the plate members 51 and 52 and carries a trip yoke 65 having extended arms 66 and 67 as shown in Figs. 3, 4, 5, and 14. The arm 66 of the yoke is provided with a beveled offset end 68 which normally engages the under side of the offset portion 62 of the finger 59. The yoke 65 is under the tension of a spring 69 which tends to raise the free end of the arm 66. The check or sheet when fed into the machine by the belt operates, as previously stated, to raise the arm 56 at which time the rod 55 will swing the finger 59 to the position shown in Fig. 14, whereby the spring 69 operating upon the yoke will swing the arm 66 thereof to the elevated position shown in said figure, it being understood that the arm 56 will remain in raised position as long as the check is in contact with the roller 58. The arm 66 has an outwardly projecting stud 66b and an inwardly extending stud 66c, the stud 66b carrying a roller 66a provided for a purpose described hereinafter.

Referring to Fig. 7, showing the parts of the power clutch mechanism in normal position, the arm 67 of the trip yoke 65 normally engages a stud 70 on the pivoted clutch finger 71. The finger 71 is pivoted to the clutch release yoke 72 by the stud 73 and is provided with a part 71b adapted to engage the teeth of a constantly driven ratchet member 74 loosely mounted on the main shaft 18. A spring 86 is connected with the finger 71 and with a support 87 and tends to throw the part 71b of the finger into engagement with ratchet member 74. However, the arm 67 of the yoke 65, normally engages the stud 70 of the finger 71 and prevents the part 71b from engaging the teeth of the ratchet 74. As the yoke 65 is rocked upon release of the arm 66, by the finger 59, the arm 67 is moved away from the stud 70 which allows the spring 86 to move the portion 71b of the finger into engagement with the constantly driven ratchet member 74, as shown in Fig. 8. As the portion 71b of the finger 71 engages the ratchet, the rotation of the latter moves the finger 71, pivoted to the clutch yoke 72 downward, causing the yoke member 72 carried on rod 64 to rock and consequently release the clutch mechanism.

The portion 75 of the clutch release yoke 72 normally engages a lug 76 of the clutch stop arm 77, carried on the clutch disk 78 by the stud 79, the clutch disk 78 being pinned on the shaft 18. The clutch stop arm 77 has a notch 81, engaged by the projection 82 of the clutch dog 83, also carried on the disk 78 by the stud 83a. The dog 83 is provided with a lug 84 which is adapted to engage the teeth of the constantly rotating driving member 85 loosely mounted on shaft 18. The spring 86, connected with the finger 71, not only tends to keep the stud 70 in contact with the arm 67 of the yoke 65, but retains the arm 88 of the yoke 72 in normal position against the adjustable stop 89, and the portion 75 of the yoke 72 against the projection 76 of the arm 77.

It will now be seen that when the portion 71b of the finger 71 is engaged with a tooth of the rotating member 74 that the finger will be moved downwardly thereby rocking the yoke member 72 about its pivot 64 and thus withdrawing the portion 75 of the yoke from the lug 76 of the stop arm 77 to release the latter. The spring 90, connected to the arm 77, is normally tensioned through engagement of the yoke portion 75 with the lug 76 of the arm 77 whereby the portion 84 of the clutch dog 83 is normally held out of engagement with the teeth of the driving member 85 and against a stud 91, carried by the disk 78. When the portion 75 of the yoke 72 is withdrawn from engagement with the lug 76 of the dog 77, the spring 90 rotates the arm 77 about its pivot 79 which in turn actuates the dog 83 to bring the lug 84 thereof into the path of the teeth of the continuously rotating drive member 85, as shown in Fig. 9. When the lug 84 of the clutch dog 83 engages the teeth of the drive member 85, it forms through the disk 78, a drive connection between the motor driven power means and the drive shaft 18. The drive member 85 is formed integral with the member 74 and is loosely mounted on the shaft 18 and driven by the gear 19 through the previously described motor driven parts. As shown in Fig. 3, the hub 92 of the gear 19 is notched and receives a protruding portion 93 of the ratchet member 74 by which the latter is driven.

Referring to Figs. 3 and 5, the arm 80 of the clutch release yoke 72 has a portion 94, which extends over the main shaft 18 and is normally out of the path of a lug 95 of a locking member 96 carried on the rod 87, and controlled by the operator's lock 97. The operator's lock is secured by the bracket 97a to the casing 11 within the latter to lock the main shaft 18 against rotation. As shown in Fig. 10, the bolt 98 of the lock normally engages the locking member 96, which is adapted to be rocked upon the rod 87 against the tension of a spring 99 upon casting the bolt of the lock. The disk 100 is secured on the main shaft 18 and is provided with a notch 101 adapted to receive the lug 95 of the locking member 96, whereby to prevent operation of the shaft and the printing means driven thereby.

The lug 95 of the locking member is also adapted to extend in the path of the portion 94 of the arm 80 to prevent the yoke 72 from rocking whereby the clutch dog 83 is held out of engagement with the drive member 85. When the yoke member 72 is actuated by the finger 71 through operation of the ratchet member 74, the portion 80 of the yoke is moved in a clockwise direction from the position shown in Fig. 5, past the notch 101 of the disk 100 into the path of the lug 95 of the locking member 96. Therefore, it will be seen that it is impossible to cast the bolt of the operator's lock to shift the locking member 96 after the clutch has been tripped and while the machine is in motion, or at any time when the operating parts occupy other than a normal inoperative position. When the lug 95 rests in the notch 101 a portion 96b on the lever 96 engages a pin 66c on the lever 66, and prevents upward movement of the latter which if permitted would result in tripping of the clutch which, of course, should not take place with the shaft 18 locked against rotation.

When the dog 59 is moved to release the lug 68 of the arm 66 as previously described, the roller 66a of the arm will move into the notch 102 of a cam 103 secured to the main shaft 18, as shown in Fig. 14. The cam 103 through engagement with the roller 66a returns the yoke 65 and the arm 66 thereon to normal position upon initial movement of the shaft 18, and retains the yoke in the position shown in Fig. 5 throughout the entire cycle of operation.

In this operation the arm 67 of the yoke 65 is also moved to normal position where it engages the stud 70 of the finger 71 to prevent the portion 71b from engaging the toothed member 74, at which time the spring 86 will rock the clutch release yoke 72 upward to bring the portion 75 thereof into the path of the lug 76 of the clutch arm 77. As the clutch disk completes the cycle of movement the lug 76 contacts with the portion 75 of the yoke and rocks the arm 77 upon its pivot 79 to disengage the lug 84 of the clutch dog 83 from the drive member 85, thereby discontinuing operation of the main shaft 18 and retaining it at normal inoperative position.

During completion of the cycle of operation the sheet passes from under the roller 58 to allow the arm 56 to drop to normal position as shown in Fig. 5, at which position the end 57 of the arm will rest upon the portion 49 of the casing 11. When the arm 56 returns to normal position the dog 59 serves to retain the lug 68 of the arm 66 in normal latched position. The arm 66 is latched by the dog 59 before the notch of the cam 102 is moved opposite the roller 66a, otherwise the clutch mechanism would again be allowed to trip and cause a continued rotation of the main shaft 18. Arm 66 is latched by arm 60, if disk 103 reaches normal position while arm 56 is held up by a check. When the check is ejected from the machine, arm 56 drops and arm 59 engages arm 60 releasing it from the projection 68 which then is retained in normal position by dog 59. It will be noted that the projection 61 of the dog 60 is slightly longer than that of the projection 62 of the dog 59. With this construction it is impossible for the lug 68 of the arm 66 to become latched under the projection 61 of the dog 60.

The printing cylinder unit is mounted on the main shaft 18 between the supporting plates 50 and 51, and comprises a pair of circular plates 105 and 106, Figs. 3, 4, and 6, connected by two sets of cross rods 107 and 107a. The plate 106 carries the ribbon feeding and reversing mechanism proper, which will be hereinafter described and the plate 105 carries the cylinder stop dog 191 and other mechanism relating to the ribbon spool holding means, which will also be hereinafter described.

The printing cylinder including the plates 105 and 106, is secured upon and rotated with the main shaft through the member 110 fixed to the shaft. Referring to Figs. 3 and 6, the member 110 has an extended recessed portion 110a, which is securely fastened to the disk 105 by means of a stud 109. An insert 108 is provided in the recess of the extension 110a of the member 110 through which the stud 109 projects, the insert being of rubber or any other suitable material which will yield slightly and serve as a shock absorber to somewhat lessen the shock caused by stopping the heavily weighted printing cylinder when the main driving shaft 18 is stopped by disconnecting the clutch. The plates 105 and 106 are also provided with bushings 105a and 106a which serve to properly aline the plates on the shaft 18.

The cross rods 107 carry the plate holder 111 to which the signature plate 111a is suitably attached, and the cross rods 107a carry the plate holder 112 upon which the background plate 112a is mounted. The plate holders 111 and 112 are substantially the same in construction, although suitable means may be provided so that the plate holders cannot be interchangeably disposed on the printing cylinder. This means may comprise a pin on the side plate 105, not shown, which will enter a notch in one of the holders not provided in the other. Inasmuch as the plate holders 111 and 112 and associated locking means thereof are substantially identical the same reference will suffice for both.

The plate holders 111 and 112 are each provided with an arcuate portion 113 substantially concentric with the peripheral portions of the plates 105 and 106, to which the printing plates 111a and 112a are attached. The side portions 114 and 115 of the plate holders are extended inwardly from the arcuate portion 113 and are provided with slots 116 at one end, which receive one of the cross rods 107 and 107a. The side portions of the holders are cut away at their opposite ends at 117 to engage the other cross rods 107 and 107a, the side portions being connected by a rod 118 which is adapted to be engaged by a latch dog 119, pivoted at 120 to a yoke member 121, carried on a cross rod 122, the ends of which are supported by the circular plates 105 and 106. The latch dog 119 is constantly under the tension of a spring 123 connected therewith and with the rod 122. Secured to the yoke member 121 is a pin 124 which projects through an elongated opening 125 in the plate 105, as best shown in Fig. 6. The pin 124 extends outside of the circular plate 105 and is accessible for manual operation as a means for releasing the plate holders. In releasing the holders 111 and 112 the yoke members 121 are rocked upon their respective pivot rods 122 by raising the pin 124 in order to withdraw the yielding latch dog 119 from the rod 118. When the yoke member 121 is rocked, the dog 119 yields against the tension of the spring 123 and passes over the rod 118, thereby releasing the plate holder and allowing it to be readily removed from the supporting cross rods 107 and 107a. When the dog 119 is withdrawn from engagement with the rod 118, the portion 126 thereof engages the portion 127 of the yoke member 121, thereby limiting the inward movement of the dog 119 by the tension of the spring 123.

The inking ribbons 128 and 129 are guided by the holding members 130 for the printing plates in order to assure the proper position of the ribbons with respect to the plates. Referring to Figs. 24, 25, and 26 the ribbon guide members 130 are disposed beneath the plate holders 111 and 112 and are held in position by the lugs 131 and rod 118 extending through the lugs. The plates 130 are provided with openings 132 in the center thereof to allow for free operation of the latch dog 119. At the ends of the ribbon guide plates 130, there are provided fingers 133 and 134, which overlie the ribbon to guide and retain it in proper relation with respect to the printing plates.

The rotary printing unit is provided with two independent ribbons and two spools for each ribbon. The feeding and reversing mechanisms for the spools are substantially the same and have therefore been given the same reference characters. In the operation of the printing unit the ribbons are automatically fed step by step over the printing plates from one spool to another. When the ribbon is entirely unwound from the supply spool the reversing mechanism is automatically actuated to reverse the feed of the ribbon. Referring to Figs. 3, 4, 6, and 27, the spools for advancing the ribbons are shown at 135 and 136. Secured to the cylinder plate 105 is a U-shaped bracket member 137, one for each ribbon spool. A spring plunger 139 is guided in the member 137 and extends through the plate 105 and the sliding bushing 138 which is rigidly secured to the plunger. The bushing 138 is provided with a collar 140 which limits the movement of the plunger under the pressure of the spring 139a. The plunger 139 is provided with a reduced end 141 inserted within a central opening in the spool. The bushing 138 has secured thereto a disk 142 which is provided with a notch 143. The end flanges of the ribbon spools 135 and 136 are provided with lugs 144 normally engaging in the notches 143 of the disks 142. The plunger 139 extends beyond the extremity of the U-shaped member 137 and attached thereto is a knurled operating member 145 for rotating the spool. When it is desired to remove the ribbon spools the plungers 139 are withdrawn against the tension of the springs 139a and at the same time the disks 142 are moved outwardly from engagement with the lugs 144 on the spools.

The printing cylinder plate 106 has secured thereto bushings 146 which carry the rotatable studs 147. The studs 147 are provided with reduced ends 149 and have secured thereto disks 148. The disks 148 are also provided with notches 148a for receiving lugs 150 formed on the adjacent flanges of the ribbon spools. The ends 149 of the studs 147 also enter the central openings of the ribbon spools to form supports for the same. The studs 147 are provided with toothed wheels 151 thereon adjacent the bushings 146.

Referring to Figs. 3, 4, and 6, the toothed wheel 151 drives one spool and the toothed wheel 151a drives another spool, one for each ribbon, depending upon the direction of feed and position of the feed pawls 153 and 153a, adapted to engage the wheels 151 and 151a respectively. The pawls 153 and 153a are pivoted on studs 154 carried on the opposite ends of an arm 155 supported on the shaft 18. The arms 155 while similar in construction, are independent of each other and both operated by the reversing arm 160. The arm 155 is provided with the lugs 156 to limit the downward movement of the pawls 153 and 153a under the tension of the springs 157a, connected with the pawls. A latch 157 is carried by a stud 158 on the arm, the latch being provided with a roller 159, which is yieldingly held in contact with the notched end of a reversing arm 160 by the spring 161. The reversing arm 160 is carried by the shaft 18 and is provided with spaced notches 162 and 163 at each end thereof, which are adapted to receive the roller 159 on the latch 157. The reversing arm 160 is formed with a central projecting portion 164, which has a notch 165 in which is disposed a roller 166, carried by a stud 167 on a cam yoke lever 168. The cam yoke 168 is pivoted on the cylinder plate 106 at 169 and is provided with rollers 170 and 171 which engage a stationary cam 172 carried on the shaft 18. A stud 173 is secured to the supporting plate 51 and to the cam 172 to retain the cam in stationary position and to insure proper positioning of the latter on the shaft 18. It will be seen that as the rollers 170 and 171 carried by the yoke 168, rotate around the cam 172, during rotation of the printing cylinder plates 106, that the rollers will cause the yoke 168 to have a rocking movement which will in turn be transferred to the reversing arm 160. Inasmuch as the roller 159 is yieldingly retained by the spring 161 in one or the other of the notches 162 or 163 of the arm 160 the latter will be oscillated at each revolution of the printing unit to move the arm 155 which in turn will advance one set of the operating pawls to actuate the corresponding toothed wheel 151 or 151a for driving the ribbon holding spools.

The dogs 174, Fig. 27, pivoted on the plate 106, serve to prevent unwinding of the ratchet wheel 151 or 151a under the tension of the ribbon when the pawl disengages the teeth of the ratchet wheel during feeding operation.

The ribbon reversing mechanism is automatically operated by the tension on the ribbon when it is entirely unwound from the supply spool, at which time the reversing arm 160 will continue to exert pressure on one of the pawls 153 or 153a to advance the ratchet wheels 151 or 151a. However, when the tension of the ribbon is sufficient to overcome the spring 161 connecting the reversing arm 160 and the latch 157 carrying the roller 159 the spring will yield and allow the roller to shift from one of the notches of the arm 160 to another. This action of the reversing arm 160 will alter the position of the pawl carrying arm 155 sufficiently to allow the other pawl to engage the opposite ratchet wheel 151 or 151a, to effect reversal of ribbon carrying spools whereby to wind the ribbon on the empty spool. As shown in Fig. 4, the inactive pawls normally rest on the lugs 156 of the arm 155 under tension of the springs 157a.

The pawl carrying arms 155 are provided with short studs 176 which extend inwardly through openings in the cylinder plate 106, Fig. 27. The members 177, carried loosely on the rods 122, are each provided with cam portions 178 and 179 adapted to be engaged by extended portions 180 of the dogs 174. The forked ends of the members 177 are adapted to receive the studs 176, carried by the arms 155. When the arms 155 are moved from one position to another by the action of the reversing arm 160, the studs 176 engaging in the notches of the members 177 serve to alter the position of said members and the cam notches 178 and 179 thereon whereby to cause one dog 174 to become disengaged from its corresponding ratchet wheel and the other to move into engagement with its corresponding ratchet wheel, thus completing the operation for effecting reversal of the spool feeding means, it being understood that the spring 181 will serve to hold the dogs in engagement with the ratchet wheel with which it is associated.

Means is provided to prevent the main shaft and printing unit from rebounding when the mechanism is stopped suddenly at completion of each cycle of operation of the unit. This means comprises a stop dog 191 pivoted at 193 on a member 192 carried by the supporting plate 50, as best shown in Figs. 3 and 6. The member 192 is pivotally connected with the plate 50 by a stud 195 and carries a pin 194 which is mounted in a resilient cushioning member 198 carried by a tubular boss 198a formed on the supporting plate 50. The stop dog 191 is provided with a lug 196 which normally engages the underside of the flange of the supporting member 50, under the tension of a spring 197. The stop dog 191, when the machine is in normal position, is engaged by a member 190 on the cylinder plate 105 to prevent reverse rotation of the cylinder. Upon rotation of the cylinder to normal inoperative position the member 190 thereon will pass under stop 191 which will then yield against the tension of the spring 197 until cleared by the member 190, whereupon the stop will then snap back to normal position with its extremity in the path of said member to prevent the cylinder and main shaft from rebounding or rotating in the reverse direction. By preventing the main shaft from rebounding or reversing, displacement of the clutch dogs and other parts on the cylinder is prevented. The resilient mounting 198 is effective as a means for cushioning the rebound of the printing cylinder, and also tends to eliminate the undesirable noises which would otherwise result from the sudden stopping of the cylinder.

Figure 11:
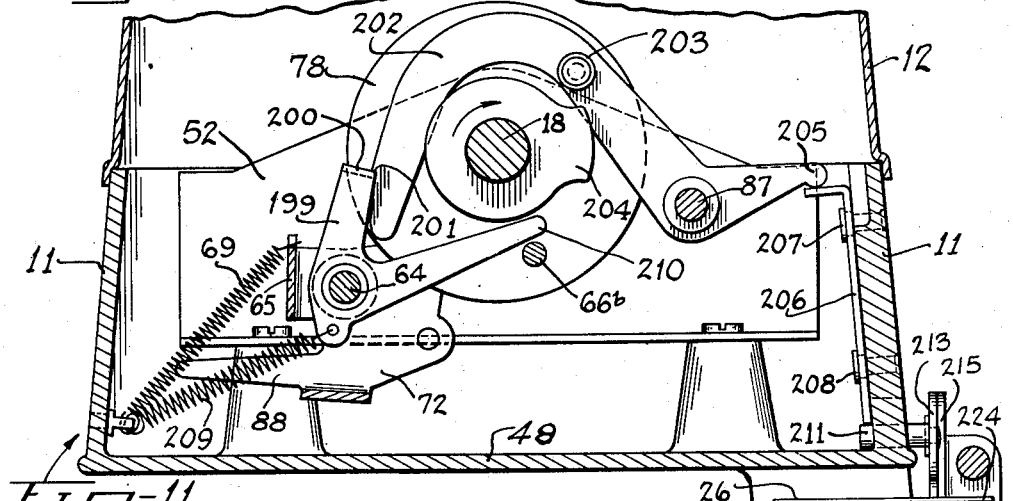
Fig. 11 is a fragmentary transverse sectional elevation taken on line 11—11 of Fig. 3, showing in part, the means for controlling the stop mechanism for the sheets.

Referring to Figs. 3, 11, and 14, the latch 199 on the rod 64 has a lug 200 formed on its end which normally engages the shoulder 201 of the cam follower arm 202 carrying a roller 203, adapted to come in contact with a cam 204, secured on the shaft 18. The cam follower 202 has an extension 205 which engages a slide 206, carried by studs 207 and 208 on the side wall of the casing 11. The latch 199 is held in contact with the cam follower arm 202 by a spring 209 and an extension 210 of the latch lies in the path of the roller stud 66b on the arm 66 of the yoke 65. When the arm 66 is released by the sheet operated lever 56, as previously described, the roller stud 66b engages the extension 210 of the latch 199 to withdraw the latter from the shoulder 201 of the lever 202 whereby to free the lever which will then drop to the position shown in Fig. 14 and which will later be returned to the position shown in Fig. 11 by the contacting of the cam 204 with the roller 203 on the lever.

Referring to Figs. 3, 11 and 13, the slide 206, carried by the casing 11, engages a stud 211 on a bellcrank lever 213 carried by a stud 214 on a bracket 215 secured to the flange 216 of the shelf 27 by studs 217. The offset end 218 of the lever 213 carries one end of a link 219, the other end of which is connected at 223 with an arm 222 secured on a reduced end of the hexagonal rod 220 free to rock upon the base 10 of the machine. Slidably mounted on the rod 220 is a yoke 225 having a stop 224 thereon which is automatically positioned in the path of the sheets fed into the machine by the conveyor belt 22, as shown in Fig. 14. The arm 225 is provided with an extended operating part 227 which is readily accessible for manual operation for adjusting the arm and stop thereon longitudinally of the rod so as to locate the stop at any desirable position whereby the printing plates may be made to operate upon different portions of the sheets. A flat spring 228 is carried by the yoke 225 and engages the rod 220 to retain the arm in adjusted position. A spring 229 is connected to the link 219 and to a bracket 230 and tends at all times to raise the stop 224 into sheet arresting position. However, the stop is normally maintained in lowered position by the cam follower arm 202, as shown in Fig. 11.

When the stud 66b on the arm 66 moves the latch 199 to release the cam follower lever 202 on rod 87, the portion 205 of the lever is raised, thus allowing the slide 206 to be raised through operation of the bell crank lever 213 actuated by the link 219 and spring 229 whereby to raise the stop 224 to the full line position shown in Fig. 13. The stop 224 remains in raised position until the latter part of the cycle of operation of the printing unit and is lowered when the cam 204 contacts with the roller 203 to operate the lever 202 to depress the arm 205 thereof whereby the slide 206 is moved downwardly to swing the bellcrank lever 213 for the purpose of moving the stop to inoperative position. The stop 224 is thus withdrawn from the path of the check or other sheet just prior to the completion of the operation of the second printing plate. When the second printing plate has completed the printing operation, the check is released, and inasmuch as the stop has been withdrawn, the conveyor belt 26 will convey the check from the machine into a suitable receptacle, not shown, which may be carried by the rods 232, secured to the shelf 27.

Referring to Figs. 1, 3, 4, and 23, it is desirable at various intervals during each operation of the rotary printing unit to release the pressure roller 233 which is normally in yielding contact with the feed belt 26. The roller is provided to retain the sheet in contact with the belt to insure proper feeding of the check. After the check has been positioned against the stop member 224 by the belt and the first printing plate on the cylinder has contacted with the check, the roller 233 is raised. As previously described, when the printing plate engages the check to perform a printing operation thereon it operates to move the check in a direction opposite to that in which it was previously moved by the conveyor belt. It is therefore desirable to raise the pressure roller 233 from contact with the check at the proper time so that the check may be freed for movement by the printing device, thus eliminating any possibility of buckling or improper displacement of the sheet through contact with said device during the printing operation. Referring to Fig. 23, the roller 233, as shown in the dotted line position, has been raised by the action of the cam 234 on the shaft 18. The cam 234 is provided with portions 235 and 236 which operate respectively to raise the roller slightly in advance of the operations of the background and signature plates. The roller is raised through operation of the lever 237 carried on rod 64 and the member 238 which supports the roller. The lever 237 carries a roller 239 which engages the cam 234 and also has a lug 240 adapted to engage the inner end of an operating arm 241 for the roller carrying member 238. The member 238 is mounted on a stud 243 carried by a U shaped bracket 244, secured by a screw 247 to the casing 11. A support 246 is secured on the bracket by a screw 247 and carries and upstanding stud 249 having a spring 250 thereon engaging a nut 251 on the stud and a washer 252 on the member 238 as shown in Fig. 23. The spring 250 yieldingly maintains the roller 233 in its engagement with the conveyor belt 26 and allows the roller to compensate for various thickness of paper that may be fed into the machine. The adjusting nut 251 is provided in order that the spring pressure on the roller may be varied.

Figure 12:
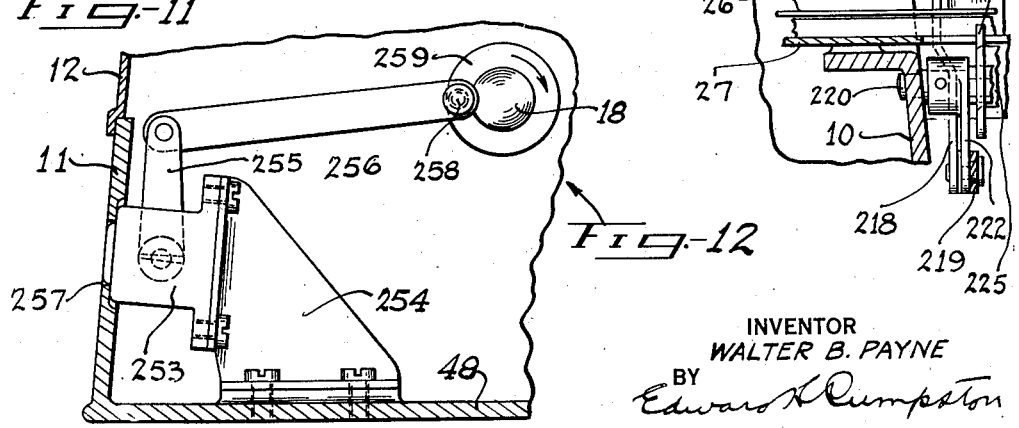
Fig. 12 is a fragmentary sectional elevation showing the sheet counting means and operating means therefor.

Referring to Figs. 2 and 12, a counter 253, mounted on a bracket 254 secured to the bottom of the casing 11, records each complete printing operation of the machine. The counter may be read through the opening 257 provided in the side of the casing 11. The counter is actuated through the arm 255 and the link 256, connected by a stud 258 to a collar 259 to the shaft 18. As the shaft 18 is rotated, the eccentric movement given the link 256 rocks the arm 255 to actuate and advance the counter mechanism one step. The counter 253 may be of any well known type, but in a machine of this character it is preferred to use a non-resettable counter.

In order to insure ejection of the sheet from the machine after the printing operations are completed, additional pressure rollers 260 and 261 are provided which are normally in engagement with the conveyor belt 26. The pressure rollers are carried by an arm 262 pivoted at 263 to a bracket 264 mounted on the wall of the casing 11, Fig. 4. The inner roller 261 is mounted on a support 265 which is pivoted at 266 upon the arm 262. The rollers are normally retained in contact with the conveyor belt 26 by their own weight. However, if it is desired to withdraw the rollers the arm 262 may be swung upwardly to an elevated position.

Referring to Fig. 4, a steel ball 267 is normally held in contact with the moving belt 26, but allows the sheet to pass beneath the same when it is fed into the machine by the belt, the ball affording additional means for insuring proper feed of the check through the machine. The ball is carried in a bushing 268, mounted in the bottom wall of the casing 11, and is suitably retained in the bushing, but is free to move up and down therein.

Referring to Figs. 1, 2, and 18, the casing 11 is hinged upon the base at one end, as indicated at 269 and the cover 12 is hinged at 270 upon the casing 11. The cover is normally held against release upon the casing by a suitable key controlled lock 271 and the casing 11 is normally retained in latched engagement with the base 10 by a yieldable latching means which will presently be described.

Referring to Figs. 15, 16, and 17, the bolt 272 of the casing lock is slotted at 273 to receive the sliding latch plate 274 secured to the bolt by a pin 275. The latch plate is provided with elongated slots 276 through which project studs 278 extending inwardly from the front wall of the casing 11. Lugs 279 and 280 are formed on the opposite ends of the plate 274 and are adapted to engage in openings 281 formed in a locking plate 282 carried by the cover 12. When the lock 271 is in locked position the lugs 279 and 280 of the latch plate project through the openings 281 and prevent the casing 12 from being swung to open position, upon its hinges. The lock 271 is secured to the front wall of the casing 11 by a bracket 283, and is held in position by a screw 284 extending through the end flanges of the bracket.

The casing 11 is held in yielding contact with the base 10 by means of latches 285 and 286. The latches are shown in their normal locking position in Fig. 15 and are adapted to be swung about their pivotal studs 278 to withdraw the lugs 287 thereon from the notches 289 of suitable retaining members 288 carried by the base of the machine, as best shown in Fig. 17. When the free ends of the members 285 and 286 are moved in the direction of the arrows and to the dotted line position shown in Fig. 15, the lugs 287 are moved out of the notches 289 of the retaining members 288, thereby allowing the casing 11 to be swung upwardly to the position shown in Fig. 18. Latches 285, 286 interlock with yoke 282 on the cover 12, so that in order to close the cover it is first necessary to engage the latches with the links 288, since when the latches are unhooked as shown in dotted lines in Fig. 15 it is impossible to close the cover or to lock it. A leaf spring 294 is secured to the bracket 283 and engages the locking plate 282 to exert a slight pressure on the cover 12 when it is locked, whereby to eliminate the possibility of vibration and noise when the machine is operating.

It is desirable to have the casing 11, which carries the printing cylinder, yieldingly connected to the base 10, which carries the platen roller 27. This yielding connection serves to prevent undue strain on the printing plates and platen, and insures an accurate and efficient operation of the printing device.

The latch securing members 288 are spaced from the side walls of the base by the bushings 290a and are slotted at 291 to receive the cross bar 290 as shown in Fig. 15. The members 288 are under constant tension of the springs 292, which serve to yieldingly resist upward movement of the casing on the base when the casing and base are latched by members 285 and 286.

A centering pin 292, shown in Fig. 15, is secured on the bottom wall of the casing 11 and extends through an opening 293 provided in the top wall of the base 10. The centering pin is provided to insure proper alinement of the casing 11 and the base 10 when they are brought in contact one with another.

The printing plate holders 111 and 112 are each provided at one side thereof with a series of parallel grooves 295 adjacent the printing plates as indicated in Fig. 24. With the present method of handling checks the usual data, including the printing of the characters constituting the "amount" is applied to the check prior to the step of affixing the maker's signature. Inasmuch as checks are generally run through a machine to have the "amount" and other data applied thereto just prior to their insertion within the check signer, the ink applied by the first machine may not be thoroughly dry by the time the check reaches the printing plates of the check signer and to avoid transfer of ink on the check to the printing plate holders the grooves 295 are provided in the latter to substantially reduce the area of that portion of the holder permitted to engage the check. The grooved portions 295 of the printing plate holders of the present machine are in a position to contact with the printed "amounts" of the checks at the points at which they are generally applied to the checks.

It has been found that by providing a series of ridges or relatively fine projections on the portions 295 of the printing plates or holders therefor that no objectionable amount of ink is picked up from the previously printed "amounts" by the ridges or projections during the check signing operations. The ridges or pointed projections may be formed in any desired manner, and also function as a means for advancing or assisting in the advancement of the checks or other sheets and furthermore serve as a means for guiding and maintaining the check in the desired path of movement during the printing operations.

In replacing the ink ribbons, or in adjusting or repairing the machine, it is often desirable to rotate the printing cylinder either manually or by power. However, in rotating the cylinder under these conditions, it is not always possible or convenient to feed checks or sheets of paper between the printing cylinder and the platen roll. In order to prevent, under these conditions, the printing plates from transferring to or contacting with the platen roll, means is provided for slightly raising the casing so that during the rotation of the printing cylinder the printing plates will not come in contact with the platen roller 29. To this end a lever 297 is pivoted at 296 to a bracket 295a secured to the front wall of the casing 11, as best shown in Figures 15, 16 and 17. The lever is readily accessible for manual operation when the cover 12 is in open position as shown in Fig. 18. The lever extends through the opening 299 in the bottom of the casing 11 and carries a roller 298 which is brought into contact with the top of the base 10 to swing the casing to the inclined position shown in Fig. 18. The casing can be swung to the position shown in Fig. 18 without disengaging the latches 285 and 286 from the retaining members 288, since the latter are free to move upwardly under the tension of the springs 292 by reason of the elongated slots 291 formed in the lower ends of said members, as shown in Fig. 15.

The multicolored inking ribbon shown at 40a in Fig. 22a is intended for use with the printing plates for printing in different colors, either on the ground portion of the check or the signature proper or both as may be desired whereby to increase the difficulty of reproducing the signature photographically or otherwise.

In the operation of the machine it will be understood that the motor may be started to continuously drive the belt for feeding the sheets to the machine. The sheets may then be placed one after another between the guides 40 and upon the belt for advancement between the platen and the printing device, the operations of the latter and of the clutch and stop mechanisms being automatic and one sheet being printed for each complete operation of the rotary printing device and discharged from the machine by the feed belt.

Before describing the more or less detailed operations of the several mechanisms it may be well to state that the sheet will be advanced between the platen and the printing device by the belt before the first printing plate has had time to contact with the sheet, this being done substantially at or slightly after the time at which the sheet is arrested by the stop means. As soon as the inking ribbon and the roughened portion 295 of the first printing plate contacts with the sheet, the direction of movement of the latter will be reversed by the same by reason of the fact that the printing device is rotated in a direction opposite to that in which the sheet is moved by the feeding belt. Upon completion of the movement of the sheet by the first printing plate and the resulting printing operation, the feed belt will again advance the sheet into engagement with the stop means which is done before the second printing plate has had time to engage the sheet and reverse its movement.

At this point it may be stated that with the present printing device the second printing plate is so positioned relative to the first and the speed of the operating parts so timed that the second plate will engage and operate upon substantially the same portion of the sheet which was previously operated upon by the first printing plate thereby superimposing the printed characters of the second plate upon those printed by the first plate as, for example, superimposing the parts 38 and 39 of the maker's signature shown in Fig. 20 on the protective ground portion 37 shown in Fig. 19, the result being the application of the complete signature to the check as shown in Fig. 21, and as also shown in Fig. 22.

However, if desired the two printing plates or the characters thereon can be so positioned upon the rotary printing unit and the speed of the parts so regulated as to cause the characters to be applied to different portions of the sheet as, for example, one in advance of another.

It will be understood that as soon as the second printing plate of the present design has completed its printing operation, it will release the sheet which will then be picked up by the continuously rotating belt and carried to its destination, the automatic stop means having in the meantime moved out of the path of the sheet.

The clutch for driving the shaft 18 which operates the rotary printing unit is released, as previously stated, through the lifting of the arm 56 by the sheet when the latter is first advanced toward the stop 224 by the feed belt. The raising of the arm by the sheet serves to rock the finger or guard 59 for the yoke 65 to the position shown in Fig. 14, whereby the arm 66 of the yoke is swung upwardly carrying with it the arm 67 in the path of the pin 70 on the clutch releasing arm or finger 71, at which time the free end of the latter will be moved by the spring 86 into engagement with the teeth of the constantly driven member 74 loosely mounted on the shaft 18. The arm 71 will then be forced downwardly by rotation of the member 74 to swing the yoke 72 on the rod 64 whereby to move the shoulder 75 of the yoke out of the path of the lug 76 on the spring pressed member 77 carried by the shaft driving disk 78. The member 77 will then be freed for movement by the spring 90 to swing the driving pawl 83 into engagement with the teeth of the member 85 which is rigidly connected with the constantly driven member 74 thereby causing the clutch parts to operate to drive the disk 78 fixed to the shaft 18 which will effect one complete revolution of the printing unit. As soon as the lug 76 on the driving member 77 has cleared the shoulder 75 of the yoke 72, the latter will be returned to the normal position shown in Fig. 7 at which time it will engage the lug 76 on the pivoted driving member 77 following each complete revolution of the disk 78, thus causing the member 77 to shift the driving pawl 83 to release position relative to the toothed member 85 whereby the clutch means is disconnected from the shaft with the result that the rotary printing unit is brought to rest at normal position.

During the operations just described, the automatic sheet stop mechanism is released to permit the portion 224 thereof to move into the path of the sheet as shown in Fig. 14. The release of the stop mechanism is effected by the upward movement of the arm 66 of the yoke 65 to the position shown in Fig. 14 at which time the roller 66a on the stud 66b carried by the arm moves into a notch 102 of a cam member 103 on the shaft 18. The stud 66b is then permitted to engage and lift the arm 210 of the latch 199, Fig. 11, to move the latch out of engagement with the lever 202 which when released will be moved by the slide 206 to the position shown in Fig. 14. The slide is actuated by the bellcrank 213 and link 219 through the medium of the spring 229 whereby to raise the arm 225 to position the stop 224 in the path of the sheet advanced by the belt 26, Figs. 13 and 14.

Depression of the stop is effected at the proper time by the cam 204 on the shaft 18 through engagement with the roller 203 on the lever 202 whereby the end 205 of the lever is moved downwardly to depress the slide 206 which operates the bellcrank 213 and link 219 to lower the stop, this operation being completed immediately following the operation of the second printing plate or near the completion of the cycle of operation of the rotary printing device.

During each cycle of operation of the printing device the roller 233 of the arm 241 will be lifted from engagement with the feed belt through operation of the lever 237 and cam 234 on shaft 18, the roller being lifted slightly in advance of the operation of each printing plate to allow for freedom of movement of the sheet by the printing plates.

The counter 253 for maintaining a record of the number of sheets printed will be operated by the previously described parts shown in Fig. 12 at each complete revolution of the shaft 18.

The automatic ribbon feeding and reversing mechanisms are designed to operate in the manner previously described, the step by step movement of the feeding mechanism being under the control of the fixed cam 172, Fig. 4, and the reversing mechanism being responsive to the tension of the ribbon when the latter is completely unwound from the supply spool.

Locking of the machine against operation is effected by turning the key of the operator's lock 97 to move the bolt 98 from the position shown in Fig. 5 to that shown in Fig. 10, whereby the lug 95 on the pivoted member 96 is moved into the notch of the disk 100 fixed on the operating shaft 18 in which position the lug will prevent tripping of the clutch release yoke 72 through engagement of the arm 80 of the yoke with the lug.

It will be understood that in signing the check by applying the complete signature thereto, as shown in Fig. 21, that the ground portion 37 and the symbolical signature portion 38 may be applied at one operation and the name signature 39 at another operation if desired, and that the colors of said portions may be varied to provide for any preferred color combination.

It will be further understood that either of the signature portions 37 or 38 may be omitted if it is preferred to have only one relatively complicated design or symbol associated with the name signature to form the complete signature of the maker of the check.

Furthermore, if desired, one or more printing plates may be used in the present machine to apply any desired data to a sheet, without effecting any change in the design of the machine or in its method of operation.

I claim:

1. In apparatus for printing sheets, supporting means, a plurality of sheet advancing and printing devices operable to successively engage and print on the sheet while advancing the same in one direction, and means for moving the sheet in an opposite direction between the printing operations of said devices.

2. In apparatus for printing sheets, supporting means, a plurality of rotary sheet advancing and printing devices operable while rotating to successively engage and print on the sheet while advancing the same in one direction, means for rotating said devices, and means for moving the sheet between said printing operations in a direction opposite to that in which it is moved by said printing and advancing devices.

3. In apparatus for printing sheets, supporting means, platen means on the supporting means, a rotary unit on the supporting means having a plurality of sheet advancing and printing devices operable while rotating the unit in one direction to successively engage and print on the sheet while advancing the same in said direction through cooperation with the platen means, means for moving the sheet between the printing operations of said devices in a direction opposite to that in which it is moved by said printing and advancing devices, and means for rotating the unit in said direction.

4. In apparatus for printing sheets, supporting means, a plurality of sheet advancing and printing devices on the supporting means each including type and inking ribbon means, said devices being operable to successively engage and print on the sheet while advancing the same in one direction, and means for moving the sheet in an opposite direction between the printing operations of said devices.

5. In apparatus for printing sheets, supporting means, a plurality of printing devices movable on the supporting means to advance and successively print on the sheet while moving it in one direction, platen means cooperating with said devices during the printing operations thereof, and means for feeding the sheet to said devices, said means operating between the printing operations of said devices to move the sheet in a direction opposite to that in which it is advanced during said printing operations.

6. In apparatus for printing sheets, supporting means, a plurality of printing devices movable on the supporting means to advance and successively print on the sheet while moving it in one direction, platen means cooperating with said devices during the printing operations thereof, means for feeding the sheets to said devices, said means operating between the printing operations of said devices to move the sheet in a direction opposite to that in which it is advanced during said printing operations, and stop means for arresting movement of the sheet when the feeding means has advanced it to a predetermined position relative to said devices.

7. In apparatus for printing sheets, supporting means, a plurality of sheet printing devices on the supporting means, a sheet engaging and advancing part associated with each of said devices, said parts operable to successively engage and advance the sheet in one direction and the corresponding printing devices operating at the same time to print on the sheet, means for operating said devices and said parts, and means for moving the sheet between the operations of said printing devices in a direction opposite to that in which it is moved by the sheet engaging and advancing parts.

8. In apparatus for printing sheets, supporting means, a rotary element on the supporting means having a plurality of printing devices thereon operable during one revolution of the unit to successively engage and advance the sheet in one direction and also operating to print thereon during advancement of the sheet in said direction, means for moving the sheet in an opposite direction between the printing and advancing operations of said devices, driving means for rotating said element, means for discontinuing operation of the driving means previous to completion of each revolution of said element, means for arresting movement of the element upon discontinuing operation of the driving means, and yieldable stop means for resisting rebound of the element when arresting movement of the same.

9. In apparatus for printing sheets, supporting means, a plurality of sheet advancing and printing devices operable to successively engage and print upon the sheet while advancing the same in one direction, mechanism for moving the sheet in an opposite direction between the printing operations of said devices to position it for successive engagement by said devices, mechanism for operating said devices, and actuating means for said mechanisms adapted to operate them in a predetermined timed relation whereby to insure operation of said devices on substantially the same portion of the sheet.

10. In apparatus for printing sheets, supporting means, a rotary unit on the supporting means having a plurality of sheet advancing and printing devices operable while rotating the unit in one direction to successively engage and print on the sheet while advancing it in said direction, feed means for moving the sheet in an opposite direction between the printing operations of said devices to position it for successive engagement by said devices, means for operating said rotary unit, and means for arresting movement of the sheet by said feed means at a predetermined point to insure operation of said printing devices substantially on the same portion of the sheet.

11. In apparatus for printing on sheets, supporting means, a rotary unit on the supporting means having a plurality of sheet advancing and printing devices operable while rotating the unit in one direction to successively engage and print on the sheet while advancing it in said direction, a feed belt for moving the sheet in an opposite direction between the printing operations of said devices to position it for successive engagement by said devices, an adjustable pressure roll cooperating with the feed belt to maintain the sheet thereon when moving it in the last mentioned direction, means for arresting movement of the sheet by said feed belt at a predetermined position to insure operation of said devices substantially on the same portion of the sheet, operating means for said rotary unit, and actuating means for said pressure roll controlled by said operating means and adapted to shift the pressure roll from operating position in advance of the operation of each of said rotary printing devices.

12. In a check signing machine, supporting means, platen means on the supporting means, a rotary unit on the supporting means having spaced printing portions thereon, one comprising characters representing the signature of the maker of the check and another having characters for printing a ground portion for the signature on the check, stop means for the check at one side of the unit, feeding means for moving the check in one direction between the rotary unit and the platen means and into engagement with the stop means, means for rotating the unit to cause said spaced printing portions to successively engage and move the check in an opposite direction and to print the characters of said portions on the check in superimposed relation, said feeding means returning the check to the stop means following each printing operation, and means for operating the feeding means.

13. In apparatus for printing sheets, supporting means, a plurality of printing devices movable on the supporting means to successively print on and at the same time advance the sheet in one direction and each including inking ribbon means, means for operating said devices to effect successive movements of the sheet in said direction, means for moving the sheet in an opposite direction between the printing operations of said devices, means operating automatically between said printing operations to feed the ribbon means in one direction, and means for automatically reversing the ribbon feed means when the ribbon is unwound from the supply spool.

14. In apparatus for printing sheets, supporting means, a plurality of printing devices movable on the supporting means to successively print on and at the same time advance the sheet in one direction, means for operating said devices to effect successive movements of the sheet in said direction, means for moving the sheet in an opposite direction between the printing operations of said devices, automatic stop means for limiting the movement of the sheet in said last mentioned direction, and means controlled by the operating means for said devices adapted to control the movements of the stop means.

15. In apparatus for printing sheets, supporting means, a plurality of printing devices movable on the supporting means to successively print on and at the same time advance the sheet in one direction, means for operating said devices to effect successive movements of the sheet in said direction, means for moving the sheet in an opposite direction between the printing operations of said devices, automatic stop means movable to a predetermined position upon release in advance of the movement of the sheet in the last mentioned direction to limit its movement in said direction, and holding means for maintaining the stop means at normal inoperative position adapted to be conditioned by the operating means for the printing devices to release the stop means for movement to said predetermined position.

16. In apparatus for printing sheets, supporting means, a plurality of printing devices movable on the supporting means to successively print on and at the same time advance the sheet in one direction, means for operating said devices to effect successive movements of the sheet in said direction, means for moving the sheet in an opposite direction between the printing operations of said devices, automatic stop means movable to a predetermined position upon release in advance of the movement of the sheet in said last mentioned direction to limit its movement in said direction, holding means for maintaining the stop means at inoperative position, and a control device associated with the operating means for the printing devices adapted to normally guard the holding means and to release the same during movement of the operating means whereby to release the stop means for movement to said predetermined position, said control device being subsequently actuated by said operating means to move the holding means whereby to return the stop means to normal inoperative position.

17. In apparatus for printing sheets, supporting means, a plurality of printing devices movable on the supporting means to successively print on and at the same time advance the sheet in one direction, operating means for moving said devices to effect successive movements of the sheet in said direction, means for moving the sheet in an opposite direction between the printing operations of said devices, automatic stop means adapted upon release to move to a predetermined position in advance of the movement of the sheet in the last mentioned direction to limit its movement in said direction, holding means for maintaining the stop means at normal inoperative position adapted to be conditioned by said operating means to release the stop means for movement to said predetermined position, driving means for the operating means including releasable clutch means for connecting the driving means with the operating means, and mechanism for releasing the clutch means including a part actuated by the sheet upon moving it into position to be operated upon by the printing devices.

18. In apparatus for printing sheets, supporting means, a printing device movable on the supporting means for operation upon the sheets, operating means for the printing device, driving means for the operating means including releasable clutch means for connecting the driving means with the operating means, and mechanism for releasing the clutch means including a device automatically moved upon release into position to be operated by the driving means to effect release of the clutch and including a releasable part actuated by the sheet upon moving it into position to be operated upon by the printing device.

19. In apparatus for printing sheets, supporting means, a printing device movable on the supporting means for operation upon the sheets, operating means for the printing device, driving means for the operating means including releasable clutch means for connecting the driving means with the operating means, mechanism for releasing the clutch means comprising a device adapted upon release to be actuated by the driving means, and means for releasing said device including a member mounted independently of said driving means and actuated by the sheet upon moving it into position to be operated upon by the printing device.

20. In apparatus for printing sheets, supporting means, a rotary printing device on the supporting means, a drive shaft for said printing device, driving means, releasable clutch means for driving said shaft, a device adapted upon release to be actuated by the driving means whereby to effect release of the clutch, and mechanism for releasing said device including a member mounted independently of the driving means and actuated by the sheet upon moving it into position to be operated upon by the printing device.

21. In apparatus for printing sheets, supporting means, a rotary printing device on the supporting means, an operating member for said printing device, a driving element for said member, a driven element, relatively movable parts on the driving element normally at inoperative position and adapted upon release to be coupled with the driven element for operation thereby, movable stop means cooperating with said parts to disconnect the same from the driven element when the driving element is moved to normal inoperative position at which the stop means is adapted to arrest movement of the driving element, a device adapted when released to be coupled with the driven element for operation thereby to move the stop means whereby to release said relatively movable parts for re-engagement with and operation by the driven element to effect operation of the driving element, and means mounted independently of the driving element for releasing said device.

22. In apparatus for printing sheets, supporting means, a rotary printing device on the supporting means, an operating member for said printing device, a driving element for said member, a driven element, relatively movable parts on the driving element normally at inoperative position and adapted upon release to be coupled with the driven element for operation thereby, movable stop means cooperating with said parts to disconnect the same from the driven element when the driving element is moved to normal inoperative position at which the stop means is adapted to arrest movement of the driving element, a device adapted when released to be coupled with the driven element for operation thereby to move the stop means whereby to release said relatively movable parts for connection with and operation by the driven element to effect operation of the driving element, and mechanism for releasing said device including a member mounted independently of the driving element and actuated by the sheet while it is being moved into position to be operated upon by the printing device.

23. In apparatus for printing sheets, supporting means, a rotary printing device on the supporting means, operating means for said device, driving means for the operating means including a clutch adapted when released to automatically connect the driving means with the operating means, means operating automatically to disengage the clutch from the driving means after a predetermined number of revolutions of the rotary printing device, means for arresting movement of said printing device upon disengagement of the clutch, said last mentioned means including resilient cushioning means for resisting a rebound movement of the printing device when arrested.

24. In apparatus for printing sheets, supporting means, a rotary printing device on the supporting means, operating means for said device, driving means for the operating means including a clutch adapted when released to automatically connect the driving means with the operating means, mechanism for releasing the clutch means including a part actuated by the sheet when the latter is being moved into position to be operated upon by the printing device, means operating automatically to disengage the clutch from the driving means after a predetermined number of revolutions of the printing device, means for arresting movement of said printing device upon disengagement of the clutch, said last mentioned means including resilient cushioning means for resisting a rebound movement of the printing device when arrested.

25. In apparatus for printing sheets, supporting means, a rotary printing device on the supporting means, operating means for said device, driving means for the operating means including a clutch adapted when released to automatically connect the driving means with the operating means, mechanism for releasing the clutch means including a part actuated by the sheet when the latter is being moved into position to be operated upon by the printing device, means operating automatically to disengage the clutch from the driving means after a predetermined number of revolutions of the printing device, means for arresting movement of said printing device upon disengagement of the clutch, cushioning means for resisting a rebound movement of the printing device when arrested, feeding means for advancing the sheets to the printing device, automatic stop means operating upon release to arrest the sheet at a predetermined position relative to the printing device, and means for releasing the stop means actuated by the printing device operating means upon release of the clutch means.

26. In apparatus for printing sheets, supporting means, a printing device on the supporting means, operating means for said device, constantly operated driving means, releasable clutch means for actuating said operating means adapted when released to be automatically coupled with the driving means, and a device adapted for movement into engagement with a portion of the driving means for operation thereby to release the clutch means.

27. In printing apparatus, supporting means, a rotary printing device on the supporting means, operating means for said rotary printing device, driving means for said operating means including clutch means adapted when released to be automatically coupled with said operating means, releasing means for the clutch means, a member associated with the operating means to prevent operation thereof, a part movable to a predetermined position to engage said member to hold it against movement, said part operating when in said position to prevent operation of the clutch releasing means, and a lock operable to move said part to said predetermined position.

28. In apparatus for printing sheets, a base, a casing hinged on the base and provided with a hinged cover, rotary printing means supported within the casing on the wall thereof, platen means on the base for cooperation with said printing means in the printing of the sheets, yieldable securing means connected with the base and extending into the casing, latching means secured within the casing on the wall thereof and movable into position to cooperate with the yieldable securing means to resist movement of the casing under pressure of the sheets when fed between the platen means and the rotary printing means, and means within the cover operating when it is in closed position to hold the latching means against release.

29. In apparatus for printing sheets, supporting means, a rotary element on the supporting means, spaced printing plates on the rotary element each provided with printing characters, an inking ribbon on each of the plates, a pair of spools for each ribbon mounted on the rotary element, mechanism on the rotary element for effecting a step by step rotation of one spool of each of said pairs to wind the corresponding ribbon upon said spools, cam means fixed relative to the rotary element adapted to operate said mechanism at each revolution of the rotary element, means on the supporting means for feeding the sheets in one direction to a predetermined position between the platen means and the rotary element, the printing plates operating successively to print on and at the same time advance the sheet from said position in an opposite direction during rotation of said element in one direction and the feeding means operating to return the sheet to said position between the operations of the printing plates, and means for operating the rotary element and the feeding means.

30. In apparatus for printing sheets, supporting means, a rotary element on the supporting means adapted for the support of spaced printing plates, a drive shaft for said element, an inking ribbon for cooperation with each of the plates, a pair of spools for each ribbon mounted on the rotary element, a ratchet wheel operatively associated with each spool, arms pivoted on the shaft adjacent the rotary element each provided with a pair of driving pawls for cooperation with the ratchet wheels of the spools of one ribbon to feed the latter in opposite directions and independently of the other ribbon, an actuating member mounted for oscillation on the shaft, yieldable operating means between each of said arms and said actuating member responsive to the tension of the ribbons when unwound to shift the arms relative to the actuating member whereby to position one or the other of the pawls on each arm in engagement with its corresponding ratchet wheel, cam means fixed relative to the rotary element, an operating lever for said actuating member pivoted at one end upon the rotary element and having spaced arms at its opposite end for engagement with said cam means for operation thereby upon operation of the rotary element, and a part intermediate the ends of said lever operatively associated with the actuating member and adapted to oscillate the same at each revolution of the rotary element.

31. In a check signing machine, supporting means, platen means on the supporting means, a printing unit movable on the supporting means and having spaced printing portions for cooperation with the platen means, one of said portions having characters forming a facsimile of the signature of the maker of the check and another portion having characters comprising a predetermined symbolical signature formed by a representation or design difficult to reproduce, and means for operating said printing unit to cause said spaced printing portions to successively engage and move the check in one direction and to print the characters of said portions on the check, and means for moving the check in an opposite direction between the check moving operations of said printing portions.

32. In a check signing machine, supporting means, platen means on the supporting means, a printing unit on the supporting means having spaced printing portions thereon, one of said portions having characters forming a facsimile of the signature of the maker of the check and another portion having characters comprising a predetermined symbolical signature, inking means of different colors for said printing portions, means for operating said unit to cause said spaced printing portions to successively engage and move the check in one direction and to print the characters of said portions on the check in different colors and in superimposed relation to form a compound validating signature, and means for moving the check in an opposite direction between the check moving operations of said printing portions.

33. In a check signing machine, supporting means, platen means on the supporting means, a rotary printing unit on the supporting means having spaced printing portions thereon, one of said portions having characters forming a facsimile of the signature of the maker of the check and another portion having characters comprising a predetermined symbolical signature, means for rotating said unit to cause said spaced printing portions to successively engage and move the check in one direction and to print the characters of said portions on the check in superimposed relation to form a compound validating signature, and means for moving the check in an opposite direction between the check moving operations of said printing portions.

34. In a check signing machine, supporting means, a plurality of check advancing and printing devices, one of said printing devices having characters forming a facsimile of the signature of the maker of the check and another having characters comprising a predetermined symbolical signature, means operable to cause said printing devices to successively engage and print said characters on the check while the check is being moved by the advancing devices in one direction, and means for moving the check in an opposite direction between the operations of said printing devices.

35. In a check signing machine, supporting means, platen means on the supporting means, spaced advancing and printing devices for the check movable on the supporting means, one of said printing devices having characters forming a facsimile of the signature of the maker of the check and another having characters comprising a predetermined symbolical signature, means operable to cause said printing devices to successively engage and print said characters on the check in superimposed relation while the check is being moved by the advancing devices in one direction, and means for moving the check in an opposite direction between the operations of said printing devices.

36. In a check signing machine, supporting means, platen means on the supporting means, a plurality of rotary check advancing and printing devices on the supporting means, one of said printing devices having characters thereon forming a facsimile of the signature of the maker of the check and another having characters comprising a predetermined symbolical signature, inking means of different colors for each of said printing devices, said printing devices being operable to successively print said characters in different colors and in superimposed relation on the check while the check is being advanced in one direction, and means for moving the check in an opposite direction between the operations of said printing devices.

37. In a check signing machine, supporting means, platen means on the supporting means, a rotary unit on the supporting means having a plurality of check advancing and printing devices, one of said printing devices having characters thereon forming a facsimile of the signature of the maker of the check and another having characters comprising a predetermined symbolical signature, means for rotating said unit in one direction, said printing devices being operable while rotating said unit in one direction to successively engage and print said characters on the check through cooperation with the platen means, and means for moving the check in an opposite direction between the operations of said printing devices.

38. In a check signing machine, feeding means for moving the check in one direction, a rotary unit having a plurality of check retracting and printing devices, one of said printing devices having characters thereon forming a facsimile of the signature of the maker of the check and another having characters comprising a predetermined symbolical signature, stop means for arresting movement of the check when the feeding means has advanced it to a predetermined position, means operable to cause said printing devices to successively engage and print said characters in superimposed relation on the check while it is being moved by the retracting means in a direction opposite to that in which it is moved by said feeding means, and means for moving said stop to inoperative position upon completion of the printing operations, said feeding means operating to advance the check beyond the stop means when the latter is moved to inoperative position.

39. In apparatus for printing sheets, supporting means, a printing device movable on the supporting means for operation upon the sheets, operating means for the printing device, driving means for the operating means having releasable clutch means for connecting the driving means with the operating means, a member for releasing the clutch means adapted upon release to move from normal position into position to be actuated by the driving means, a holding device for said member releasable for movement from normal position to free said member for operation by the driving means, said holding device operating when returned to normal position to return said member to normal inoperative position, and means actuated by said operating means upon release of the clutch means for returning the holding device to normal position.

40. In apparatus for printing sheets, supporting means, a printing device movable on the supporting means for operation upon the sheets, operating means for the printing device, driving means having releasable clutch means for connecting the driving means with the operating means, a member for releasing the clutch means adapted upon release to be actuated by the driving means, a pivoted yoke having spaced arms, one operating when in a predetermined position of the yoke to hold said member at inoperative position, and a device normally engaging the other arm of the yoke to hold the last mentioned arm at said predetermined position, said device including a part actuated by the sheet to free the yoke for movement to release said member when the sheet is moved to a predetermined position within the machine.

41. In apparatus for printing sheets, supporting means, a printing device movable on the supporting means for operation upon the sheets, operating means for the printing device, driving means for the operating means having releasable clutch means for connecting the driving means with the operating means, a member for releasing the clutch means adapted upon release to be actuated by the driving means, a holding device for said member releasable for movement from normal position to free said member for operation by the driving means, said holding device operating when returned to normal position to retain said member in normal inoperative position, mechanism for retaining said device at normal position comprising a pair of relatively movable fingers between which a portion of said device is extended when in normal position, a part for moving one of the fingers to free said device for operation, said part being actuated by the sheet when the latter is moved to a predetermined position within the machine, and means actuated by the operating means upon release of the clutch means for returning the holding device to normal position.

WALTER B. PAYNE.